United States Patent
Sasada

(10) Patent No.: US 9,134,108 B2
(45) Date of Patent: Sep. 15, 2015

(54) ANGLE DETECTION APPARATUS

(71) Applicant: Kyushu University, National University Corporation, Fukuoka (JP)

(72) Inventor: Ichiro Sasada, Fukuoka (JP)

(73) Assignee: Kyushu University, National University Corporation, Fukuoka (JP)

( * ) Notice: Subject to any disclaimer, the term of this patent is extended or adjusted under 35 U.S.C. 154(b) by 263 days.

(21) Appl. No.: 13/729,585

(22) Filed: Dec. 28, 2012

(65) Prior Publication Data

US 2013/0113467 A1    May 9, 2013

Related U.S. Application Data

(63) Continuation of application No. PCT/JP2011/063249, filed on Jun. 9, 2011.

(30) Foreign Application Priority Data

Jul. 2, 2010  (JP) .................................. 2010-152396
Mar. 25, 2011  (JP) .................................. 2011-067830

(51) Int. Cl.
*G01B 7/30* (2006.01)
*G01D 5/20* (2006.01)

(52) U.S. Cl.
CPC ............... *G01B 7/30* (2013.01); *G01D 5/2013* (2013.01)

(58) Field of Classification Search
CPC ................................. G01B 7/30; G01D 5/2013
USPC ........................................ 324/207.17, 207.25
See application file for complete search history.

(56) References Cited

U.S. PATENT DOCUMENTS

| | | | | |
|---|---|---|---|---|
| 3,012,177 A | * | 12/1961 | Mortimer | 318/647 |
| 3,239,754 A | * | 3/1966 | Odom, Jr. et al. | 324/247 |
| 3,400,328 A | * | 9/1968 | Penn et al. | 324/247 |
| 6,486,655 B1 | * | 11/2002 | Crossfield | 324/207.17 |
| 7,852,069 B2 | * | 12/2010 | Kikuchi et al. | 324/207.25 |
| 2007/0085531 A1 | * | 4/2007 | Ijima | 324/207.25 |

FOREIGN PATENT DOCUMENTS

| | | |
|---|---|---|
| JP | 2004-191069 A | 7/2004 |
| JP | 2008-029070 A | 2/2008 |
| JP | 2009-128133 A | 6/2009 |

OTHER PUBLICATIONS

L. Sasada, , S. Yamashita, and T. Nihuku, "Investigation of the Coil Arrangement to Yield Two Phase Outputs in a Rotation Angle Sensor of Axial Structure", The Papers of Technical Meeting on Magnetics, Mar. 28, 2011, 21-24, MAG-11-005, The Institute of Electrical Engineers of Japan, Japan.

* cited by examiner

*Primary Examiner* — Jay Patidar
(74) *Attorney, Agent, or Firm* — Dingman, McInnes & McLane, LLP

(57) ABSTRACT

Provided is an angle detection device capable of detecting the angle with high sensitivity by a very simple assembly process without requiring complicated processing. The angle detection device is provided with: a rotor (5) which is formed by a disk plate body produced from a magnetic substance having uniaxial magnetic anisotropy, the disk plate body rotating around a center point within the disk plate surface; a stator (3) which is provided to face the plate surface of the disk plate body of the rotor (5), has approximately the same external shape as that of the rotor, and is divided into a plurality of fan-shaped regions, and in which an exciting coil or a detection coil is wound along the outer periphery of each of the divided regions.

17 Claims, 25 Drawing Sheets (A)

(B)

(A)

(B)

(C)

(A)

(B)

Bonded with Shifted Phase of 45 Degrees (A)

(B)

(A)

(B)

(A)

(B)

ANGLE DETECTION APPARATUS

RELATED APPLICATIONS

This patent application is a continuation of International Application No. PCT/JP2011/063249, filed on Jun. 9, 2011, entitled, "Angle Detection Apparatus," which claims priority to Japanese Patent Application No. 2010-152396, filed on Jul. 2, 2010, and Japanese Patent Application No. 2011-067830, filed on Mar. 25, 2011, the contents and teachings of each of which are hereby incorporated by reference in their entirety.

FIELD

The present innovation relates to an angle detection apparatus for making an angle detection.

BACKGROUND

In order to control a driving motor, which is used for drive of for example an automobile, a robot, etc, it is necessary to detect a rotation angle of a rotor with a high degree of accuracy. A resolver has widely been used as an apparatus for detecting a rotation angle of the rotor. The resolver, which has currently been used, mainly has a stationary unit and a rotation unit, and irregularity, deviation, etc. of the stationary unit may be utilized to detect a rotation angle (see for example Japanese Patent Provisional Publication No. 2009-128133 (Patent Document 1) and Japanese Patent Provisional Publication No. 2008-29070 (Patent Document 2)).

Patent Document 1 shows an art of a resolver, which comprises a plurality of magnetic cores with wound wires, a stator having a plurality of members with wound wires, which are provided around the respective magnetic cores, and a rotor provided rotatably relative to the stator, at least one of the plurality of members with would wires being a sheet-shaped coil in which a conductive material is patterned in a spiral manner on a sheet, and at least a portion of the surface of the sheet on which the conductive material is pattern-formed, or the back surface thereof facing a side surface of the above0mentioned magnetic cores with would wires, and also shows a structure of the rotor having four projections and an eccentric structure relative to an axis.

Patent Document 2 shows an art of a structure in which the inner surface of a curved gap formation plate, which is provided on the inner surface of a ring-shaped rotor plate, is placed to face a plurality of stator-wound wires on a ring-shaped stator plate, to obtain angle signals varying in a sine wave shape.

SUMMARY

However, the arts disclosed in Patent Documents 1 and 2 have much difficulty in adjustment of the shape of the projections of the rotor and adjustment of eccentricity, and a working operation for the inner surface of the curved gap formation plate, which is provided on the inner surface of the rotor plate. Extremely precise and complicated working and assembling operation are required to manufacture the resolver, which permits to detect a rotation angle with a high degree of accuracy, thus requiring much effort and time for the operation.

An object of the present innovation is to provide an angle detection apparatus, which permits to detect an angle with a high degree of accuracy, and may be assembled in an extremely easy manner, without the need for a complicated working operation.

An angle detection apparatus disclosed in the present application comprises: a rotor in which a disk member comprising a magnetic body has a magnetic permeability, which is generally uniaxially anisotropic, the disk member being rotatable around a central point in a plane of the disk member; and a stator comprising a plurality of coils, at least one of the coils being an exciting coil that generates a magnetic field, and at least one of the coils being a detection coil that intersects with the magnetic field excited by the exciting coil to detect a voltage corresponding to an angle of rotation of the rotor.

In the angle detection apparatus disclosed in the present application, rotation of the rotor, which is constituted as the disk member having generally a uniaxial anisotropy causes permeance relative to a rotation angle to vary in a sine wave. More specifically, when the rotor rotates one revolution, inductance of the detection coil varies in a sine wave, and an angle may be detected based on the fact that each mechanical rotation of the rotor at an angle of 180 degrees causes variation in a sine wave in an electrical angle of 360 degrees. There are effects of providing an extremely simple structure, avoiding complicated working and assembling operation, thus permitting a manufacture in a very easy manner and at a low cost.

The angle detection apparatus disclosed in the present application may have a structure in which the stator has substantially a same outer shape as the disk member of the rotor and is disposed in a vicinity of the disk member of the rotor so as to face the plane thereof, the stator being divided into a plurality of fan-shaped sections, and the exciting coil and the detection coil being provided alternately on at least linear portion of the fan-shaped sections, respectively, on an outer periphery of the fan-shaped sections.

The angle detection apparatus disclosed in the present application has a plane structure in which the stator is placed so as to face the surface of the disk member of the rotor, without providing the stator so as to face an outer surface of the disk member of the rotor. This may provide an effect of decreasing the thickness in a simple manufacturing process, without deteriorating the functions.

The angle detection apparatus disclosed in the present application may further comprise a back yoke that is provided on an opposite side to the rotor relative to the stator, the back yoke having substantially a same outer shape as a disk member of the stator and being placed so as to face the disk member thereof.

In the angle detection apparatus disclosed in the present application, there is provided the back yoke that is provided on an opposite side to the rotor relative to the stator, the back yoke having substantially the same outer shape as the disk member of the stator and being placed so as to face the disk member thereof, thus providing effects of enhancing a magnetic field and improving a detection sensitivity. This back yoke may be considered as a part, which is integral with the stator.

The angle detection apparatus disclosed in the present application may have a structure in which the stator is divided into four fan-shaped sections having substantially a same outer shape; coils, which are provided on at least linear portions of the fan-shaped sections, respectively, on an outer periphery of a set of fan-shaped sections of two sets of fan-shaped sections each of which face each other relative to a central point of a disk member of the stator, are used as the detection coil, and coils, which are provided on at least linear portions of the fan-shaped sections, respectively, on an outer periphery of other set of fan-shaped sections of the two sets of fan-shaped sections, are used as the exciting coil; and in the set of the fan-shaped sections on which the exciting coils are provided, the exciting coils are placed so as to generate a magnetic field in which the exciting coils provided on the respective fan-shaped sections are opposite to each other in polarity, and in the other set of the fan-shaped sections on which the detection coils are provided, the detection coils are placed so that the detection coils provided on the respective fan-shaped sections are opposite to each other in polarity.

In the angle detection apparatus disclosed in the present application, the stator is divided into four fan-shaped sections having substantially a same outer shape; coils, which are provided on at least linear portions of the fan-shaped sections, respectively, on the outer periphery of the set of fan-shaped sections each of which face each other, are used as the detection coil, and coils, which are provided on at least linear portions of the fan-shaped sections, respectively, on an outer periphery of the other set of fan-shaped sections each of which face each other, are used as the exciting coil; and in the set of the fan-shaped sections on which the exciting coils are provided, the exciting coils are placed so as to generate a magnetic field in which the exciting coils provided on the respective fan-shaped sections are opposite to each other in polarity, and in the other set of the fan-shaped sections on which the detection coils are provided, the detection coils are placed so as to generate a magnetic field in which the detection coils provided on the respective fan-shaped sections are opposite to each other in polarity. This may provide effects of utilizing a combination of the exciting coil and the detection coil based on characteristic properties in an easy axis direction and a hard axis direction of the uniaxial anisotropy to make an angle detection with a cycle of 180 degrees.

The angle detection apparatus disclosed in the present application may have a structure in which the stator is divided into eight fan-shaped sections as divided having substantially a same outer shape, of the eight fan-shaped sections as divided, at least three fan-shaped sections are placed closely to each other so as to face the plane of the rotor in a combined state of the fan-shaped sections, and two of the detection coils and one of the exciting coil are provided alternately on at least linear portion of the fan-shaped sections, respectively, on an outer periphery of the three fan-shaped sections as divided.

In the angle detection apparatus disclosed in the present application, the stator is divided into eight fan-shaped sections as divided having substantially the same outer shape, of the eight fan-shaped sections as divided, at least three fan-shaped sections are placed closely to each other so as to face the plane of the rotor in a combined state of the fan-shaped sections, and two of the detection coils and one of the exciting coil are provided alternately on at least linear portion of the fan-shaped sections, respectively, on the outer periphery of the three fan-shaped sections as divided. This makes it possible to detect accurately a sine component and a cosine component by the minimum needed number of parts of the stator, thus providing an effect of detecting an angle of the rotor with a high degree of accuracy. Especially, a configuration in which dedicated integrated circuits are used to obtain an arc tangent of a biphase output voltage may provide an effect of simplifying a manufacturing process to improve the manufacture efficiency.

The angle detection apparatus disclosed in the present application may further comprise: a back yoke that is provided on an opposite side to the rotor relative to the stator, the back yoke having substantially a same outer shape as the disk member of the stator and being placed so as to face the disk member thereof, the back yoke being provided so as to cover at least a place in which the fan-shaped sections as divided are placed closely to each other.

In the angle detection apparatus disclosed in the present application, there is further comprised the back yoke that is provided on the opposite side to the rotor relative to the stator, the back yoke having substantially the same outer shape as the disk member of the stator and being placed so as to face the disk member thereof, the back yoke being provided so as to cover at least the place in which the fan-shaped sections as divided are placed closely to each other. This structure in which the back yoke is placed only a region having the strongest connection between the coils may provide an effect of maintain a detection accuracy of angle by the minimum needed area of the back yoke.

The angle detection apparatus disclosed in the present application may have a structure in which the stator is divided into sixteen fan-shaped sections having substantially a same outer shape, of a set of eight fan-shaped sections as placed closely to each other, a set of four fan-shaped sections, which face each other in a cross-shaped relationship relative to a central point of a disk member of the stator, detects a sine component, and other set of four fan-shaped sections detects a cosine component.

In the angle detection apparatus disclosed in the present application, the stator is divided into sixteen fan-shaped sections having substantially the same outer shape, of the set of eight fan-shaped sections as placed closely to each other, the set of four fan-shaped sections, which face each other in a cruciform relationship relative to the central point of the disk member of the stator, detects the sine component, and the other set of four fan-shaped sections detects the cosine component. This structure may provide an effect of obtaining easily an angle of rotation based on the biphase signal. Especially, a configuration in which dedicated integrated circuits are used to obtain an arc tangent of a biphase output voltage may provide an effect of simplifying a manufacturing process to improve the manufacture efficiency.

The angle detection apparatus disclosed in the present application may further comprise: a back yoke that is provided on an opposite side to the rotor relative to the stator, the back yoke having substantially a same outer shape as the disk member of the stator and being placed so as to face the disk member thereof, the back yoke being divided into eight fan-shaped sections having substantially a same outer shape in a corresponding manner to the set of eight fan-shaped sections of the stator, and a gap is provided between adjacent two of the fan-shaped sections.

In the angle detection apparatus disclosed in the present application, the back yoke is divided into eight fan-shaped sections having substantially the same outer shape in the corresponding manner to the set of eight fan-shaped sections of the stator, and the gap is provided between adjacent two of the fan-shaped sections. This structure in which the back yokes are placed only respective regions having the strongest connection between the coils may provide an effect of maintain a detection accuracy of angle by the minimum needed area of the back yokes.

The angle detection apparatus disclosed in the present application may have a structure in which two fan-shaped sections having a central angle of 45 degrees, of a plurality of fan-shaped sections as divided, which is obtained by dividing a disk member having substantially a same outer shape as the disk member of the rotor, are placed, as a fan-shaped section as divided for excitation, so as to face each other relative to a central point of the disk member, exciting coils are provided on at least linear portion thereof, respectively, on an outer periphery of the fan-shaped section as divided for excitation so as to generate magnetic fields, which are opposite to each other in polarity; two of the fan-shaped sections as divided being provided, as a sine detection fan-shaped section, adjacently to the fan-shaped section as divided for excitation, so as to face each other relative to a central point of the disk member, the detection coil that detects a sine component being provided on at least linear portion on an outer periphery of the sine detection fan-shaped section, so as to be opposite to each other in polarity; and two of the fan-shaped sections as divided being provided, as a cosine detection fan-shaped section, adjacently to the fan-shaped section as divided for excitation, on an opposite side of the sine detection fan-shaped section via the fan-shaped section as divided for excitation so as to face each other relative to a central point of the disk member, the detection coil that detects a cosine component being provided on at least linear portion on an outer periphery of the cosine detection fan-shaped section, so as to be opposite to each other in polarity.

In the angle detection apparatus disclosed in the present application, the two fan-shaped sections having a central angle of 45 degrees are placed so as to face each other relative to the central point of the disk member, the exciting coils are provided on the outer periphery of the fan-shaped section so as to generate magnetic fields, which are opposite to each other in polarity; the two sine detection fan-shaped sections are provided adjacently to the fan-shaped section as divided for excitation, so as to face each other relative to the central point of the disk member, the detection coil that detects a sine component is provided on the outer periphery of the sine detection fan-shaped section, so as to be opposite to each other in polarity; the two fan-shaped cosine detection fan-shaped section are placed on an opposite side of the sine detection fan-shaped section via the fan-shaped section as divided for excitation so as to face each other relative to the central point of the disk member, and the detection coil that detects a cosine component is provided on the outer periphery of the cosine detection fan-shaped section, so as to be opposite to each other in polarity. This makes it possible to detect accurately a sine component and a cosine component, thus providing an effect of detecting an angle of the rotor with a high degree of accuracy.

The angle detection apparatus disclosed in the present application may have a structure in which the stator comprises fan-shaped sections as divided which is obtained by dividing the stator into a plurality of fan-shaped sections; four fan-shaped sections as divided each having a central angle of 45 degrees of the fan-shaped sections as divided being provided, as a fan-shaped section as divided for excitation, so as to face each other in a cruciform relationship relative to a central point of the disk member, the exciting coils being provided on the at least linear portion so that a direction of a magnetic field, which passes through an inside of two fan-shaped sections as divided for excitation of the four fan-shaped sections as divided for excitation is positive and a direction of a magnetic field, which passes through an inside of other two fan-shaped sections as divided for excitation thereof is negative; four fan-shaped sections as divided being provided, as a sine detection fan-shaped section, so as to be adjacent to the fan-shaped section as divided for excitation and so as to face each other in a cruciform relationship relative to the central point of the disk member, a sine detection coil, which detects a sine component, being provided on at least the linear portion, which is adjacent to the fan-shaped section as divided for excitation, on an outer periphery of the sine detection fan-shaped section as provided, and two of the sine detection coils being aligned in a positive direction and other two of the sine detection coils being aligned in a negative direction; and four fan-shaped sections as divided being provided, as a cosine detection fan-shaped section, so as to be adjacent to the fan-shaped section as divided for excitation on an opposite side to the sine detection fan-shaped section via the fan-shaped section as divided for excitation, and so as to face each other in a cruciform relationship relative to the central point of the disk member, a cosine detection coil, which detects a cosine component, being provided on at least the linear portion, which is adjacent to the fan-shaped section as divided for excitation, on an outer periphery of the cosine detection fan-shaped section as provided, and two of the cosine detection coils being aligned in a positive direction and other two of the cosine detection coils being aligned in a negative direction.

In the angle detection apparatus disclosed in the present application, the four fan-shaped sections as divided for excitation each having the central angle of 45 degrees are provided, so as to face each other in the cruciform relationship relative to the central point of the disk member, the exciting coils are provided so that the direction of the magnetic field, which passes through then inside of two fan-shaped sections as divided for excitation of the four fan-shaped sections as divided for excitation is positive and the direction of the magnetic field, which passes through the inside of other two fan-shaped sections as divided for excitation thereof is negative; the four sine detection fan-shaped sections are provided so as to be adjacent to the fan-shaped section as divided for excitation and so as to face each other in the cruciform relationship relative to the central point of the disk member, the sine detection coil, which detects the sine component, is provided on the outer periphery of the sine detection fan-shaped section, the two of the sine detection coils are aligned in the positive direction and other two of the sine detection coils are aligned in the negative direction; and the four cosine detection fan-shaped sections are provided so as to be adjacent to the fan-shaped section as divided for excitation on an opposite side to the sine detection fan-shaped section via the fan-shaped section as divided for excitation, and so as to face each other in the cruciform relationship relative to the central point of the disk member, and the cosine detection coil, which detects a cosine component, is provided on the outer periphery of the cosine detection fan-shaped section, and the two of the cosine detection coils are aligned in the positive direction and the other two of the cosine detection coils are aligned in the negative direction. This makes it possible to detect accurately a sine component and a cosine component, thus providing an effect of detecting an angle of the rotor with a high degree of accuracy.

The angle detection apparatus disclosed in the present application may further comprise: a back yoke that is provided on an opposite side to the rotor relative to the stator, the back yoke being provided so as to cover at least a close area between the fan-shaped sections as divided for excitation and the sine detection coil, which are placed closely to each other, and a close area between the fan-shaped sections as divided for excitation and the cosine detection coil.

In the angle detection apparatus disclosed in the present application, there is further comprised the back yoke that is provided on the opposite side to the rotor relative to the stator, the back yoke being provided so as to cover at least the close area between the fan-shaped sections as divided for excitation and the sine detection coil, which are placed closely to each other, and the close area between the fan-shaped sections as divided for excitation and the cosine detection coil. This structure in which the back yoke is placed only a region having the strongest connection between the coils may provide effects of maintain a detection accuracy of angle by the back yoke composed of the minimum needed parts thereof and of obtaining a magnetic connection having a locally strong area, thus making it possible to detect independently a sine component and a cosine component even in a place where the cosine detection coils and the sine detection coils are placed together, and particularly in a region of the central portion of the disk member composed of the fan-shaped sections.

The angle detection apparatus disclosed in the present application may have a structure in which the back yoke has substantially a semicylindrical shape, one of edges thereof being placed adjacently to the fan-shaped sections as divided for excitation and other of the edges thereof being placed adjacently to the sine detection coil or the cosine detection coil.

In the angle detection apparatus disclosed in the present application, the back yoke has substantially the semicylindrical shape, one of edges thereof being placed adjacently to the fan-shaped sections as divided for excitation and the other of the edges thereof being placed adjacently to the sine detection coil or the cosine detection coil. This may provide an effect of permitting to obtain a strong magnetic connection, while controlling the magnetic resistance in a closed path in which the magnetic field makes the circuit, to detect independently a sine component and a cosine component.

The angle detection apparatus disclosed in the present application may have a structure in which there are provided as the stator two stators between which the rotor is placed, the stators facing the rotor; the stator is stationary with a shifted phase of 45 degrees in a plane.

In the angle detection apparatus disclosed in the present application, there are provided as the stator two stators between which the rotor is placed, the stators facing the rotor; the stator is stationary with a shifted phase of 45 degrees in a plane, i.e., in a state in which it turns 45 degrees around the central axis. This makes it possible to detect accurately a sine component and a cosine component, thus providing an effect of detecting an angle of the rotor with a high degree of accuracy. Particularly, use of the two stators, which permit to provide an output of modulation wave suppressed where appropriate, makes it possible to detect the angle with an extremely high degree of accuracy.

The angle detection apparatus disclosed in the present application may have a structure in which there are provided as the stator two stators with an aligned phase, and the rotor is placed between the two stators with a shifted uniaxial anisotropy of 45 degrees in a plane and bonded to the stators.

In the angle detection apparatus disclosed in the present application, there are provided as the stator two stators with the aligned phase, and the rotor is placed between the two stators with the shifted uniaxial anisotropy of 45 degrees in the plane, i.e., in a state in which it turns 45 degrees around the central axis and bonded to the stators. This makes it possible to detect accurately a sine component and a cosine component, thus providing an effect of detecting an angle of the rotor with a high degree of accuracy. Particularly, use of the two stators, which permit to provide an output of modulation wave suppressed where appropriate, makes it possible to detect the angle of the rotor with an extremely high degree of accuracy.

The angle detection apparatus disclosed in the present application may have a structure in which there are provided as the stator two stators with a shifted phase of 45 degrees in a plane, and the rotor is placed between the two stators so that the stators face the plane of the rotor and bonded to the stators.

In the angle detection apparatus disclosed in the present application, there are provided as the stator two stators with the shifted phase of 45 degrees in the plane, i.e., in a state in which it turns 45 degrees around the central axis and bonded to the stators, and the rotor is placed between the two stators so that the stators face the plane of the rotor and bonded to the stators. This makes it possible to detect accurately a sine component and a cosine component, thus providing an effect of detecting an angle of the rotor with a high degree of accuracy. Particularly, use of the two stators, which permit to provide an output of modulation wave suppressed where appropriate, makes it possible to detect the angle of the rotor with an extremely high degree of accuracy.

DETAILED DESCRIPTION

First Embodiment of the Present Innovation

Figure 1:
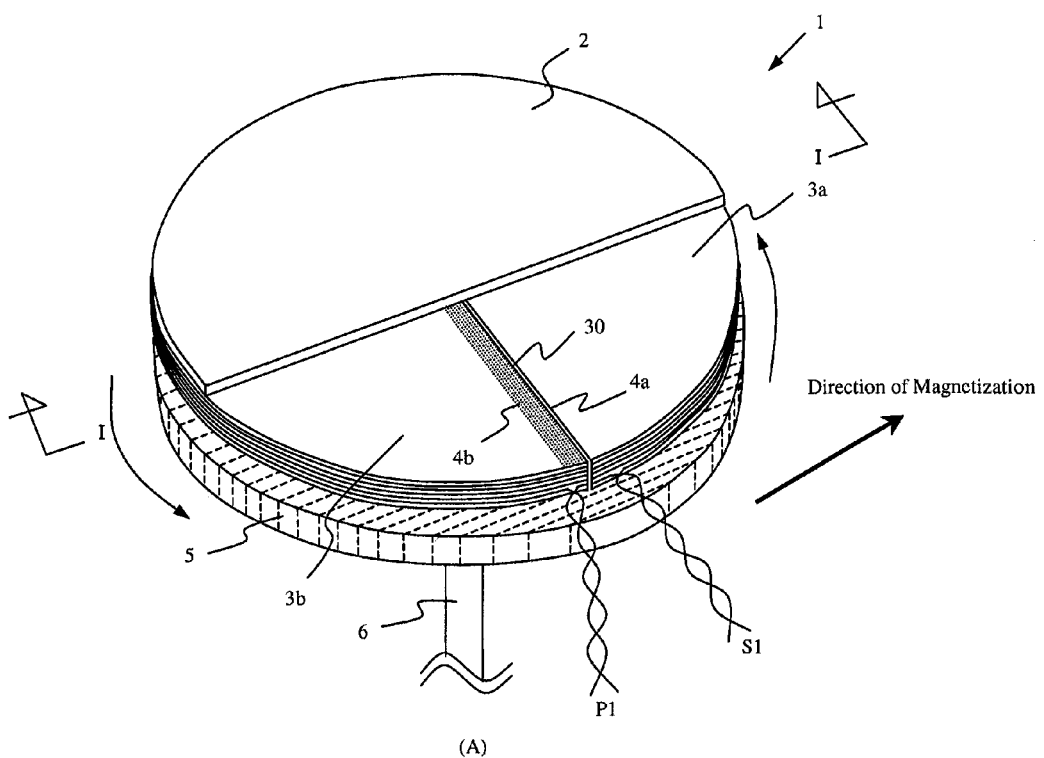
FIG. 1 includes a set of overall views of an angle detection apparatus according to the first embodiment of the present innovation.
Figure 1:
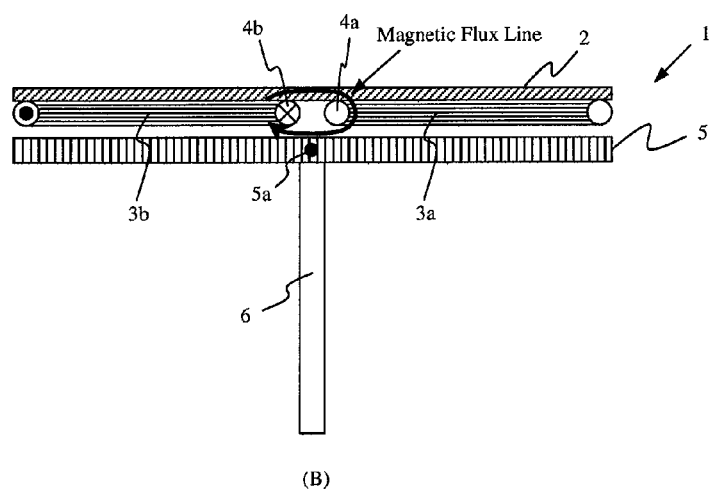
Figure 5:
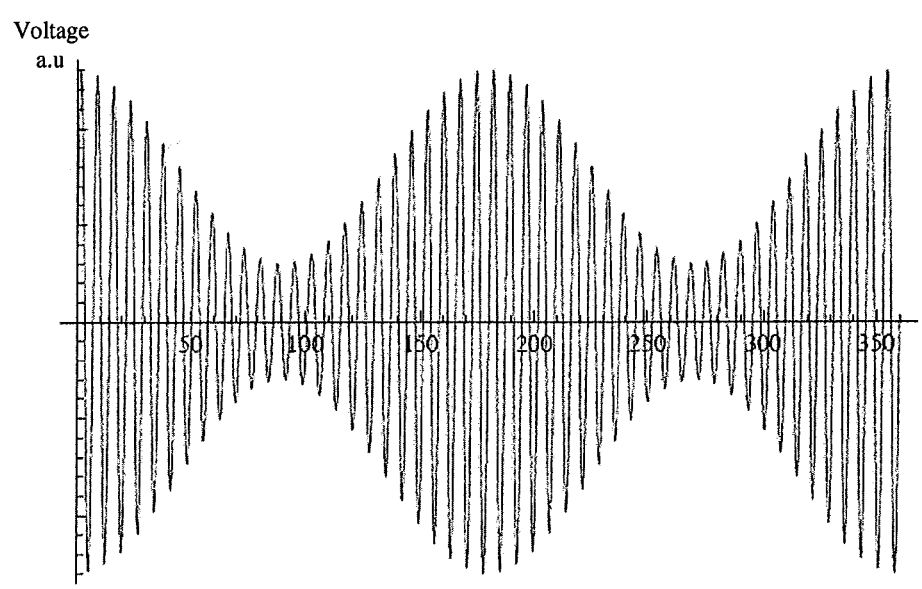
FIG. 5 is a view illustrating an output voltage waveform of the angle detection apparatus according to the first embodiment of the present innovation.

An angle detection apparatus according to the embodiment of the present innovation will be described with reference to FIGS. 1 to 7. FIG. 1 includes a set of overall views of the angle detection apparatus according to the first embodiment of the present innovation, FIG. 2 includes a set of views illustrating respective parts of the angle detection apparatus according to the first embodiment of the present innovation, FIG. 3 is a view illustrating a principle of an angle detection of the angle detection apparatus according to the first embodiment of the present innovation, FIG. 4 includes a set of views illustrating an angle dependency of a component (H//) contributing to magnetization in an exciting magnetic field H by which a magnetic body having a uniaxial anisotropy is to be magnetized, of the angle detection apparatus according to the first embodiment of the present innovation, and illustrating progress of the magnetization, FIG. 5 is a view illustrating an output voltage waveform of the angle detection apparatus according to the first embodiment of the present innovation, FIG. 6 includes a set of views illustrating an angle detection by the angle detection apparatus according to the first embodiment of the present innovation and FIG. 7 includes a set of views illustrating a formation process of a rotor of the angle detection apparatus according to the first embodiment of the present innovation.

The angle detection apparatus according to the embodiment of the present innovation comprises a rotor which is composed of a disk member, which is uniaxially anisotropic, and is rotatable around the central point in a plane of the disk member; and a stator comprising a plurality of coils, at least one of the coils being an exciting coil that generates a magnetic field, and at least one of the coils being a detection coil that intersects with the magnetic field excited by the exciting coil to detect a voltage corresponding to an angle of rotation of the rotor. The stator has substantially the same outer shape as the disk member of the rotor and is disposed so as to face the plane of the disk member thereof. The stator is divided into two fan-shaped sections (or semicircular sections) and the exciting coil or the detection coil is wound along the outer periphery of the respective divided regions. In addition, a back yoke, which has substantially the same outer shape as the disk member of the stator, is provided on the opposite side to the rotor so as to face the disk member thereof.

In the present innovation, the stator is composed of the fan-shaped sections, which are provided by dividing a stationary member having the same outer shape as the disk member of the rotor radially from the central point thereof into the fan-shaped sections, winding the exciting coil or the detection coil along the outer periphery of the respective fan-shaped sections as divided or winding the exciting coil or the detection coil along the outer periphery of the stationary member of the fan-shaped sections and assembling the fan-shaped sections into substantially the same outer shape as the disk member of the rotor. The stationary member around which the coil is wound may be formed of a magnetic material or a magnetic material may be disposed on the plane of the stationary member.

Figure 2:
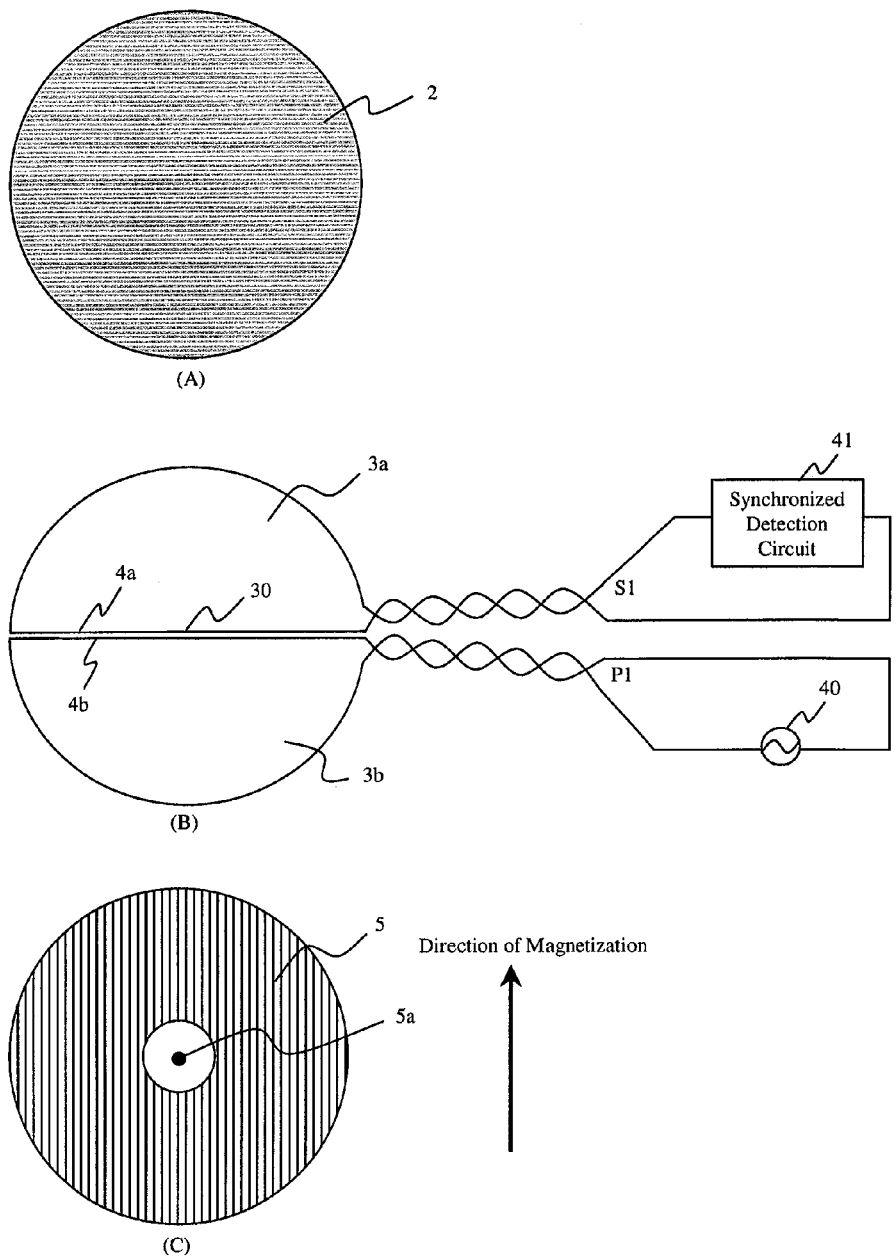
FIG. 2 includes a set of views illustrating respective parts of the angle detection apparatus according to the first embodiment of the present innovation.
Figure 3:
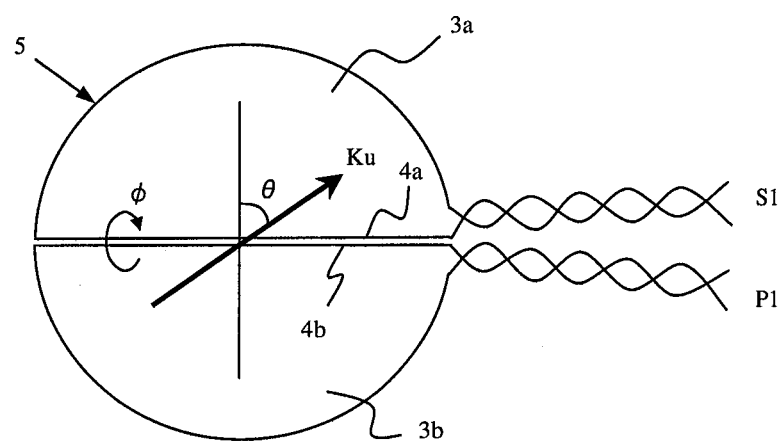
FIG. 3 is a view illustrating a principle of an angle detection of the angle detection apparatus according to the first embodiment of the present innovation.
Figure 4:
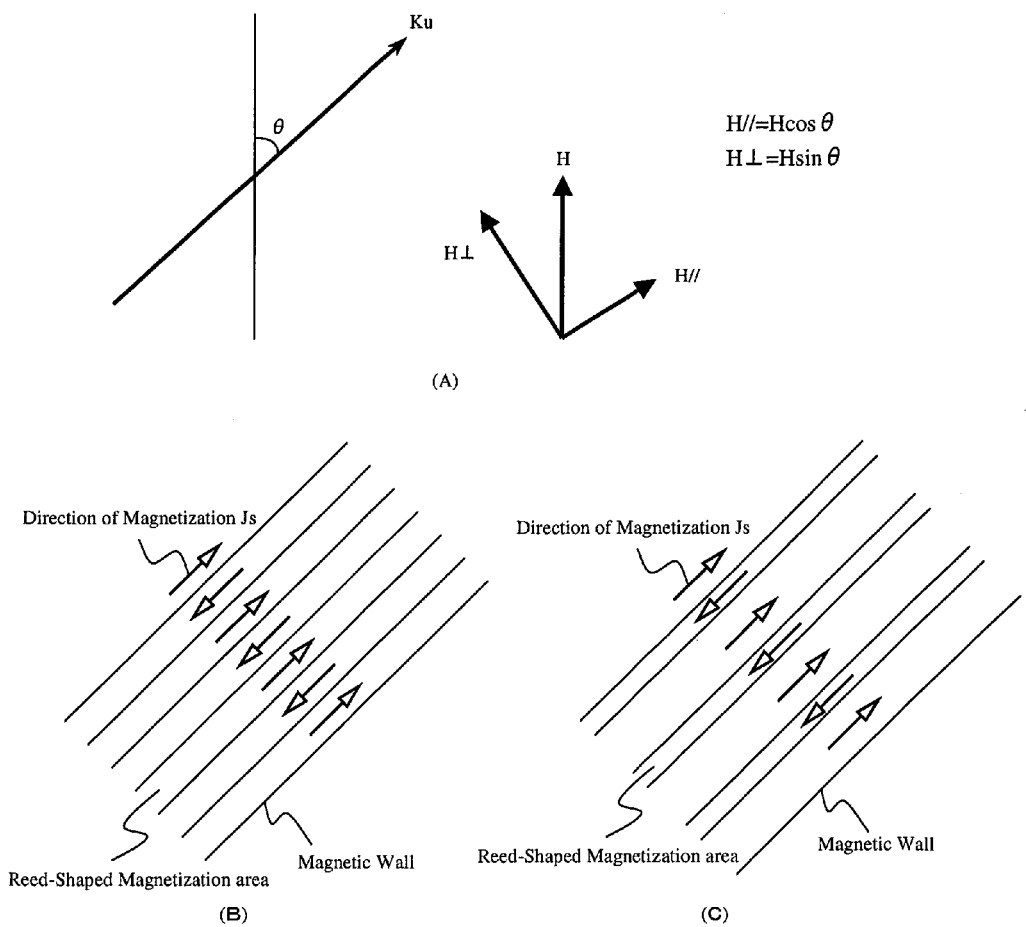
FIG. 4 includes a set of views illustrating an angle dependency of a component (H//) contributing to magnetization in an exciting magnetic field H by which a magnetic body having a uniaxial anisotropy is to be magnetized, of the angle detection apparatus according to the first embodiment of the present innovation, and illustrating progress of the magnetization.

FIG. 1(A) is a perspective view of the angle detection apparatus 1 according to the embodiment of the present innovation, FIG. 1(B) is a cross-sectional view, of the angle detection apparatus 1, cut along the line I-I with arrows in FIG. 1(A) and FIG. 2 includes the respective top plan views of the back yoke 2, the stator 3 and the rotor 5 of the angle detection apparatus 1 according to the embodiment of the present innovation. The angle detection apparatus 1 has the rotor 5, which is composed of a disk member, which is uniaxially magnetic anisotropic, and is rotatable around the central point 5a to which a rotation shaft 6 is connected, in a plane of the disk member; the stator 3, which has substantially the same outer shape and is placed so as to face the disk member of the rotor 5 in a non-contact state; and the back yoke 2, which is formed of a (isotropic) magnetic thin plate having no orientation into substantially the same outer shape as the stator 3, and is placed in a contact or non-contact state with the stator 3, so as to face the surface of the stator 3 on the opposite side of which surface the rotor 5 is placed. The back yoke 2 is actually the disk member having substantially the same outer shape as the stator, although the back yoke 2 is shown in FIG. 1(A) as having the semicircular shape for facilitation of understanding. The back yoke 2 is not always required, but is preferably provide to enhance the coupling of the magnetic flux.

The stator 3 is divided into the semicircular shape (3a, 3b) and the detection coil 4a (referred also to as "S1") and the exciting coil 4b (referred also to as "P1") are would on the respective side areas of the sections 3a, 3b. The detection coil 4a and the exciting coil 4b are for example coils of copper wire with a diameter of 0.1 mm of 100 turns. The back yoke 2 is capable of causing the magnetic flux generated by the exciting coil 4b to intersect effectively with the detection coil 4a, thus improving sensitivity. As the back yoke 2, there may be used one that is obtained for example by piling up some thin sheets of amorphous magnetic strips having a width of 5 cm and bonding them, and cutting the bonded sheets into a disk shape. Alternatively, there may be used another one that is formed for example of thin sheets of permalloy having a thickness of about 0.1 mm to 2 mm.

The rotor 5 is formed of the disk member in which a magnetic plate or a magnetic composite plate having a uniaxially magnetic anisotropy in the direction of the plane of the disk member (i.e., the direction of the arrow as shown in FIG. 1(A) and FIG. 2(C)) is joined at the central point 5a thereof to the rotation shaft 6. The magnetic plate with the uniaxially magnetic anisotropy has an easy axis direction in which the magnetic plate is easily magnetized and a hard axis direction in which it is not easily magnetized and which direction is perpendicular to the easy axis direction. More specifically, the rotor 5 rotates together with the rotation shaft 6 and the easy axis direction of the magnetic anisotropy changes along with the rotation thereof. Utilization of the change in the easy axis direction of the magnetic anisotropy permits to detect an angle of rotation. There is an assumption that the magnetic direction coincides with the easy axis direction and the hard axis direction coincides with the direction perpendicular to the magnetic direction. A magnetic permeability in the easy axis direction is large and that in the direction perpendicular to the easy direction, i.e., in the hard axis direction is small equally likely a magnetic permeability in a vacuum.

There is used a structure in which the rotor 5 is joined at the central point 5a thereof to the rotation shaft 6 so that the rotor 5 rotates along with the rotation of the rotation shaft 6. However, there may be used another structure in which the rotor 5 may rotate on the plane of the disk member via three or more supporting rollers (an angle between the lines connecting the central point and the respective adjacent supporting points being less than 180 degrees) as provided for example on the side portion of the rotor 5, without providing the rotation shaft 6.

The exciting coil 4b is connected to an alternating-current source 40 so that an alternating-current is supplied to the coil. Supply of the alternating-current to the exciting coil 4b causes a magnetic field to be generated in a perpendicular direction to the plane in the section 3b. The magnetic field has the largest intensity in the vicinity of the copper wire of the coil and the intensity thereof becomes small with decreasing distance to the central of the section 3b. More specifically, the magnetic field with the large intensity is generated in a region 30 in which the detection coil 4a and the exciting coil 4b are placed closely to each other.

The magnetic field as excited by the exciting coil 4b generates a voltage in response to the above-mentioned magnetic field. The detection coil 4a causes a synchronized detection circuit 41 connected to the detection coil 4a to detect the above-mentioned voltage. At this moment, a value of voltage as detected changes in response to an angle of the rotor 5.

Now, the description will be given below of an principle of an angle detection of the angle detection apparatus according to the embodiment of the present innovation, with reference to FIG. 3. FIG. 3 shows that the stator 3 and the rotor are placed one on another, and the magnetic member of the rotor 5 has a uniaxially magnetic anisotropy of the magnetic anisotropic energy Ku, and the easy axis direction thereof inclines at an angle of Θ relative to the stator 3.

The exciting coil P1 and the detection coil S1 generate a magnetic coupling by the magnetic flux φ in their adjacent regions 30. When the angle Θ is 0 degrees, the magnetic coupling between the exciting coil P1 and the detection coil S1 becomes the maximum due to the characteristic property in the easy axis direction and the output voltage from S1 becomes the maximum. When the angle Θ is 90 degrees, the magnetic coupling becomes the minimum due to the characteristic property in the hard axis direction and the output voltage from S1 becomes the minimum.

As shown in FIG. 4(A), an excited magnetic field H, which is generated in perpendicular to the linear portion of the adjacent region 30 of the exciting coil P1 may be divided into a magnetization easy axis direction component H// and a magnetization hard axis direction component H⊥, which is in perpendicular to the magnetization easy axis direction component H// so that the excited magnetic field H is placed between these components H// and H⊥. FIGS. 4(B) and 4(C) show a magnetization distribution in a glamorization that reed-shaped magnetization areas are generated in parallel with the easy axis direction, in which a direction of magnetic walls is in parallel with the uniaxially magnetic anisotropy and density of the magnetic flux of a magnetic plate is in the direction of the magnetic walls, i.e., only the direction Ku. FIG. 4(B) shows that Js in the diagonally right-up direction and Js in the diagonally left-down direction in a demagnetized state are the same and B//=0. FIG. 4(C) shows a state in which the magnetization takes place in the diagonally right-up direction and B//>0.

As shown in FIG. 4(C), in a magnetization process of the magnetic plate of the combination of the reed-shaped magnetization areas, which are in parallel with the direction Ku, the width of the magnetization areas with magnetization in the direction in parallel with H// increases and the width of the magnetization areas, which is not in parallel with it decreases. The density of the magnetic flux of the magnetic plate is only in the Ku direction, and there may be represented as "B//=μH// ". With respect to all the magnetic moment, there may be represented as "B⊥=0" based on the model, which is in parallel with the easy axis direction or not in parallel with it. The component, which intersects the linear portion of the detection coil S1 located in the adjacent region 30, is the component in the Θ=0 direction of B// (perpendicular to the linear portion), and there may be represented as "B//cos Θ=μH//cos Θ=μH(cos Θ)$^2$.

If the magnetic fled is excited by the alternating-current with the angular frequency "ω", there may be represented as "H=H$_0$ sin ωt ", wherein H$_0$ being amplitude. Accordingly, the inductive voltage V$_0$ to the detection coil S1 may be represented by "V$_0$=pμH$_0$(cos Θ)$^2$ sin ωt", wherein "p" being a proportional constant concerning the number of turns of the coil or the shape thereof. It is understood that the output of the angle detection apparatus 1 permits to provide an output voltage in proportion to the value of "(cos Θ)$^2$", by a synchronous demodulation to delete "H=H$_0$ sin ωt". Actually, due to the magnetic plate having the uniaxial magnetic anisotropy, as well as a connection of the exciting coil P1 and the detection coil S1 through the air, a certain output, which is not caused by "(cos Θ)$^2$" may actually appear. This causes the output in 90 degrees or 270 degrees to become zero (see the output voltage waveform in FIG. 5).

The magnetic connection of the exciting coil P1 and the detection coil S1 may change in response to the degree Θ as described above, and the output voltage may change along with it. The magnetic connection may change due to a size of the coil, a distance between the coil and the rotor 5, a shape of the back yoke, etc. However, it may be represented by an appropriate coefficient, if the original shape is constant (excluding the rotation). As a result, the magnetic connection may be represented, as a function of the angle Θ, as follows:

$$k(\Theta)=k_0 \cos^2 \Theta + k_1 \qquad \text{Equation 1}$$

wherein k$_0$ is a coefficient of the angle dependent component of the magnetic connection and k$_1$ being the component of the magnetic connection, which does not change in response to the angle.

Figure 6:
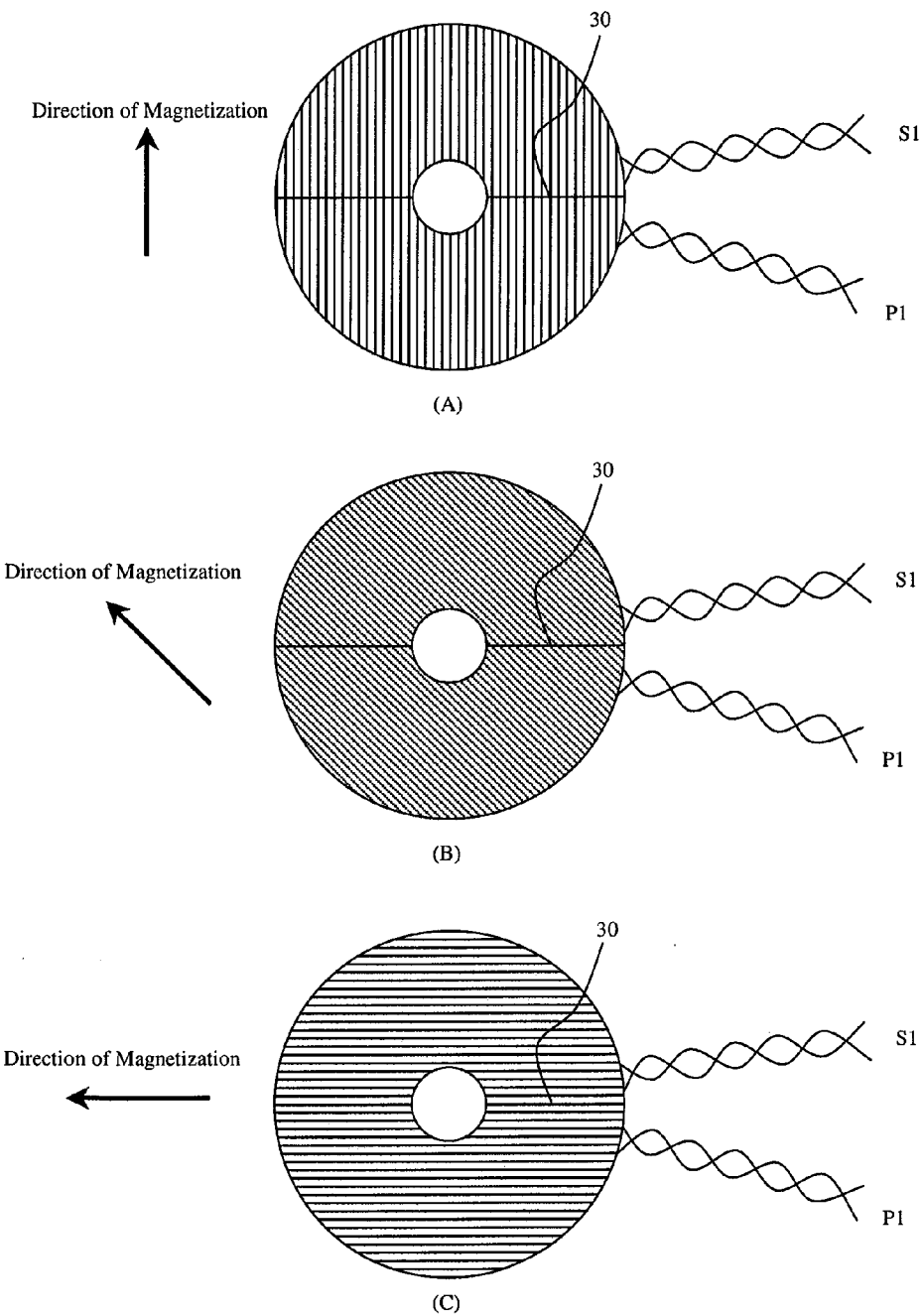
FIG. 6 includes a set of views illustrating an angle detection by the angle detection apparatus according to the first embodiment of the present innovation.
Figure 7:
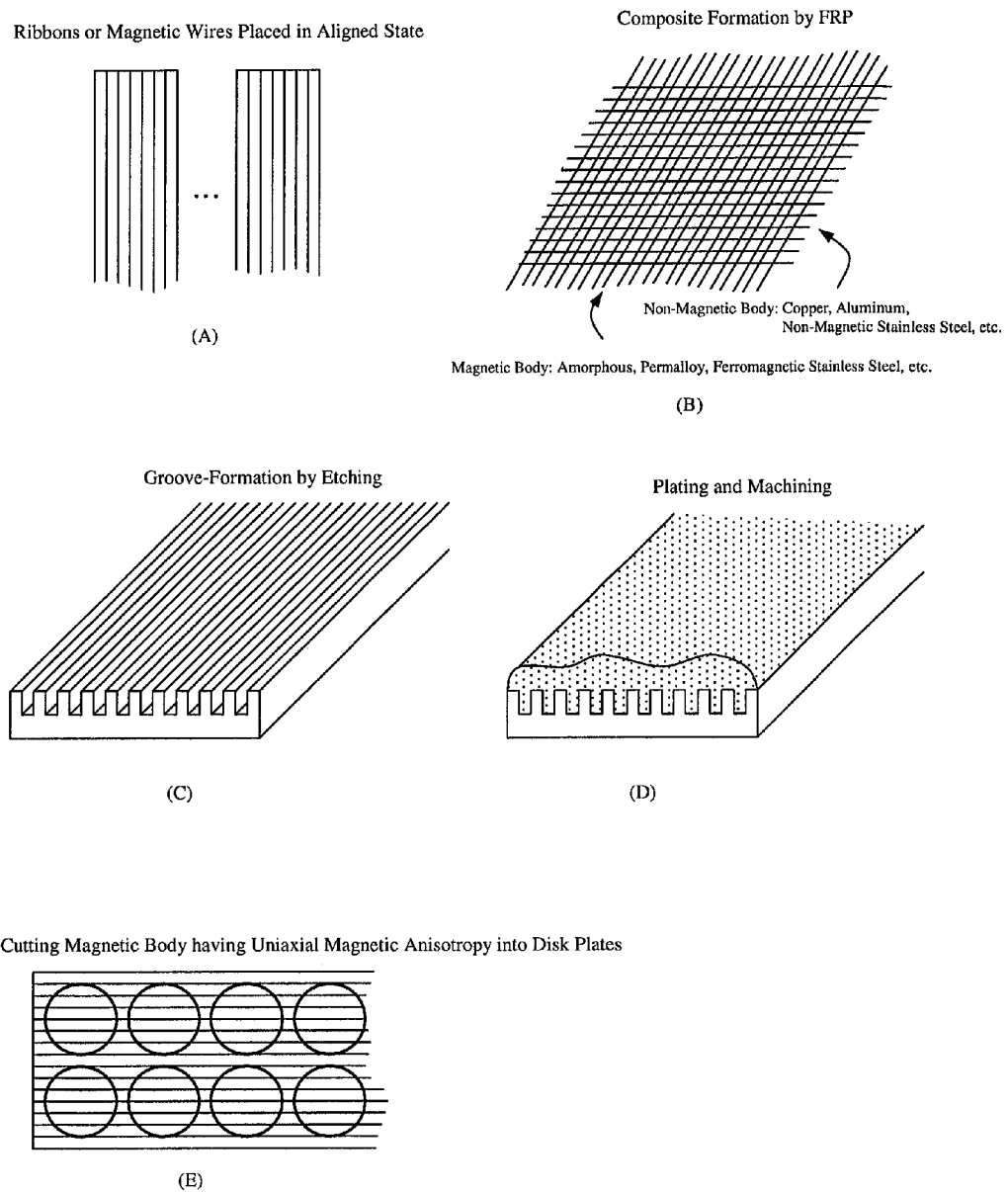
FIG. 7 includes a set of views illustrating a formation process of a rotor of the angle detection apparatus according to the first embodiment of the present innovation.

The detection of an angle by the angle detection apparatus according to the embodiment of the present innovation will be described based on the principle as describe above. FIG. 6 shows the angle detection of the rotor. The respective views in FIG. 6 are viewed from the upper side of the angle detection apparatus 1, and the regions 3a, 3b of the stator 3, and the easy axis direction are showed in the form of lines, so as to facilitate understanding. FIG. 6(A) shows zero degrees of the rotation angle, FIG. 6(B), 45 degrees of the rotation angle, and FIG. 6(C), 90 degrees of the rotation angle. As described above, the rotor 5 has the uniaxial magnetic anisotropy, and the magnetic flux may be apt to pass in the easy axis direction, but may not be apt to pass in the hard axis direction.

More specifically, the direction of the magnetic fluxes as excited is in parallel to the easy axis direction of the rotor 5 (the angle θ being zero degrees) in the region 30, which is the adjacent region between the detection coil S1 and the exciting coil P1, as shown in FIG. 6(A), the number of magnetic fluxes, which intersect with the detection coil S1, increases, resulting in an increase in output. When the rotor 5 rotates at an angle of 45 degrees, an angle between the direction of the magnetic fluxes and the easy axis direction of the rotor 5 is 45 degrees in the region 30, as shown in FIG. 6(B), with the result that the magnetic fluxes are not apt to pass unlikely the case in which the angle is zero degrees, thus leading to the smaller output accordingly. When the rotor 5 rotates at angle of 90 degrees, the direction of the magnetic fluxes as excited is perpendicular to the easy axis direction of the rotor in the region 30, with the result that the number of the magnetic fluxes, which intersects with the detection coil S1, becomes smaller, thus leading to the smaller output. Detecting the magnetic fluxes intersecting with the detection coil S1 and the value of voltage corresponding to such intersecting fluxes, in response to the rotation angle of the rotor 5 makes it possible to obtain an angle of rotation of the rotor 5.

There is described the structure in which only the rotor 5 is rotatably provided by the rotation shaft 6 and the stator 3 and the back yoke 2 are provided so as to face the disk member of the rotor. However, there may be applied a structure in which the stator 3 and the back yoke 2 are rotatably provided by the rotation shaft 6. In this case, the stator 3 has a hole, which has the same shape as the hole formed in the center of the rotor 5, in the center of the stator, and the coil is provided on the outer periphery of the fan-shaped section so as to bypass the above-mentioned hole. This causes the adjacent region 30 to be divided into two and the connection of the magnetic fluxes according to the easy axis direction of the rotor 5 are generated in the respective divided regions. For example, in FIG. 6, the rotation shaft 6 passes through the hole formed at the center, and the exciting coil and the detection coil are wound so as to bypass the through-hole. The adjacent regions 30 are divided into two sub-regions. The stator side is not directly supported to the rotation shaft 6, but is supported via bearings, etc., and fixed to the stationary unit.

In the preparation of the stator 3, the disk member may be divided into fan-shaped sections, and the exciting coil and the detection coil may be wound on the respective fan-shaped sections. Alternatively, the exciting coil and the detection coil may be previously prepared so as to match the outer shape of the fan-shaped sections and they may be fixed to the disk member. In addition, the coil may be formed by a printing method or an etching method. The fan-shaped section as divided may be provided at a part or whole of the linear portion thereof with coils or wires for excitation so as to permit simultaneous flow of the electric current in a single direction, and the other fan-shaped section may be provided with coils or wires for detection of the inductive voltage in the same manner.

Concerning a method of creating the uniaxially magnetic anisotropy of the rotor 5, there may be applied various kinds of methods such as a method of aligning narrow ribbon-shaped magnetic material or magnetic wires on a non-magnetic substrate having a disk shape in a single direction to create it (for example, closely-arranging amorphous magnetic thin strips having the width of 1 mm and the thickness of 20 μm in parallel with each other and bonding them (see FIG. 7(A)), a method of interweaving a magnetic material and a non-magnetic material through the length and breadth and impregnating them with a resin (see FIG. 7(B)), a method of forming grooves in a magnetic material by an etching process (see FIG. 7(C)), a method of plating a template prepared by an etching process (see FIG. 7(D)), a method of cutting for example a directional silicon steel plate having a magnetic anisotropy in a rolling direction or a permalloy or amorphous magnetic material having a uniaxially magnetic anisotropy, which has been prepared by a heating treatment in a magnetic field, into a disk shape (see FIG. 7(E)).

According to the angle detection apparatus of the embodiment of the present innovation, the rotor 5 is formed of the disk member having the uniaxially magnetic anisotropy so as to provide a very simple structure, thus making it possible to manufacture the apparatus in a very easy manner, without the need of complicated processing.

In addition, the stator 3 is not provided so as to face the outer surface of the disk member, but provides a face structure in which the stator faces the plane of the disk member of the rotor 5, thus permitting to decrease a thickness of the apparatus with a simple manufacturing process, without deteriorating the function.

Further, the back yoke 2, which has substantially the same outer shape as the disk member so as to face it, is provided on the opposite side to the rotor relative to the stator 3, thus permitting to enhance the magnetic field to improve the detection sensitivity.

Second Embodiment of the Present Innovation

Figure 8:
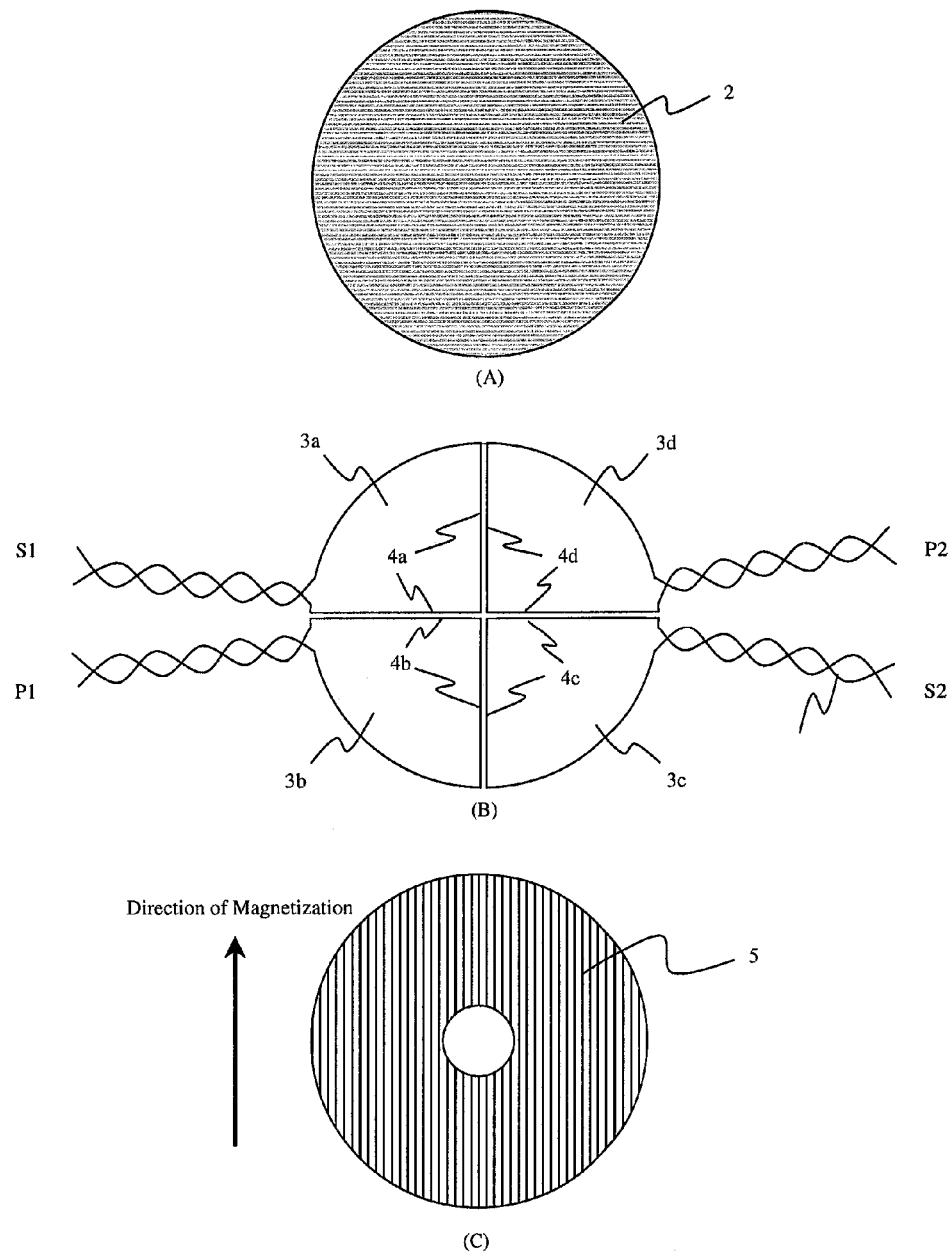
FIG. 8 includes a set of views illustrating respective parts of the angle detection apparatus according to the second embodiment of the present innovation.
Figure 9:
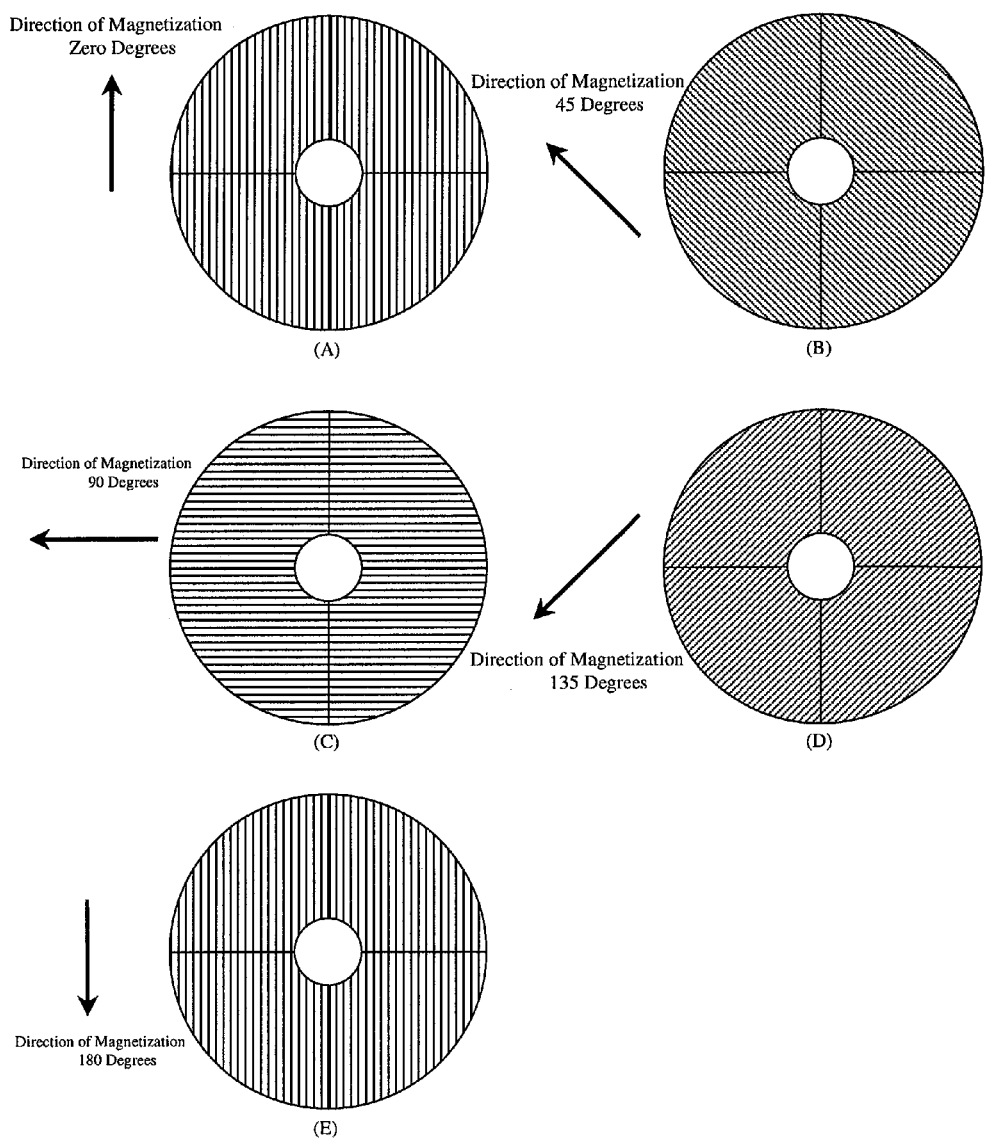
FIG. 9 includes a set of views illustrating an angle detection by the angle detection apparatus according to the second embodiment of the present innovation.
Figure 10:
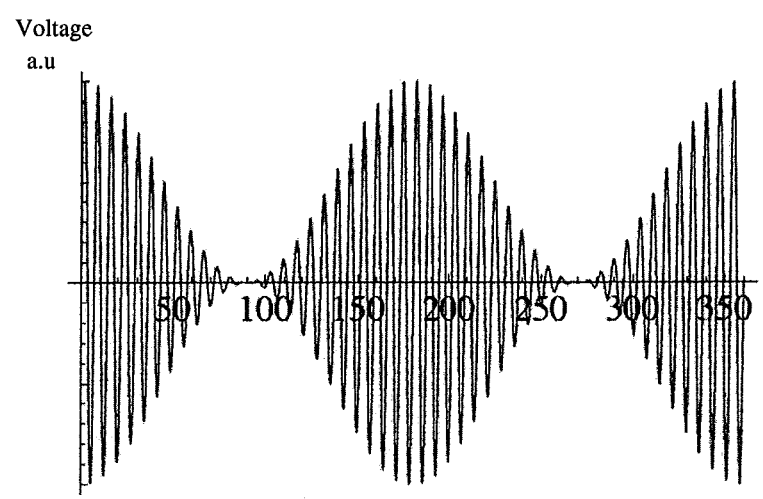
FIG. 10 is a view illustrating an output voltage waveform of the angle detection apparatus according to the second embodiment of the present innovation.

The angle detection apparatus according to this embodiment of the present innovation will be described with reference to FIGS. 8 to 10. FIG. 8 includes a set of views illustrating respective parts of the angle detection apparatus according to the second embodiment of the present innovation, FIG. 9 includes a set of views illustrating an angle detection by the angle detection apparatus according to the second embodiment of the present innovation, and FIG. 10 is a view illustrating an output voltage waveform of the angle detection apparatus according to the second embodiment of the present innovation.

The description, which overlaps with that according to the first embodiment as described above, will be omitted in the description of the embodiment according to the second embodiment of the present innovation.

The angle detection apparatus according to this embodiment of the present innovation has a structure in which the stator formed of the disk member is divided into four fan-shaped sections having substantially the same outer shape, coils, which are wound along the outer periphery of the respective first fan-shaped section and third fan-shaped section, which constitute a set of fan-shaped sections of two sets of fan-shaped sections each of which face each other relative to the central point of the disk member of the stator, are used as the detection coil, and coils, which are wound along the outer periphery of the respective second fan-shaped section and fourth fan-shaped section, which constitute the other set of fan-shaped sections, are used as the exciting coil, and the exciting coils are wound so that the direction of the magnetic field excited by the exciting coil wound on the second fan-shaped section and the direction of the magnetic field excited by the exciting coil wound on the fourth fan-shaped section are opposite to each other in polarity. A wire connection is made so that the detection coil wound on the first fan-shaped section and the detection coil wound on the third fan-shaped section are also in opposite to each other in polarity. Here, the first fan-shaped section and the third fan-shaped section constitute a set of sections that face each other relative to the axis of the disk member of the stator, and the second fan-shaped section and the fourth fan-shaped section constitute the other set of sections that face each other relative to the axis of the disk member of the stator.

FIG. 8(A) is a top plan view of the back yoke 2 of the angle detection apparatus according to this embodiment of the present innovation, FIG. 8(B) is a top plan view of the stator 3 of the angle detection apparatus according to this embodiment of the present innovation and FIG. 8(C) is a top plan view of the rotor 5 of the angle detection apparatus according to this embodiment of the present innovation. In the embodiment of the present innovation, the stator 3 is divided into four fan-shaped sections having substantially the same outer shape, as shown in FIG. 8(B), coils, which are wound along the respective outer periphery of a set of fan-shaped sections, which is composed of the first fan-shaped section 3a and third fan-shaped section 3c, are used as the detection coils 4a, 4c (referred also to as "S1" and "S2", respectively), and coils, which are wound along the respective outer periphery of the other set of fan-shaped sections, which is composed of the second fan-shaped section 3b and fourth fan-shaped section 3d, are used as the exciting coils 4b, 4d (referred also to as "P1" and "P2", respectively). The respective coil is wound along the respective periphery of the fan-shaped section with about 100 turns and has a height of about 2 mm.

The exciting coils P1 and P2 are wound so that the directions of the magnetic fluxes, which are perpendicular to the direction of the plane of the stator 3, are opposite to each other (When one of them is an N-pole, the other becomes an S-pole) and a wire connection is made so that the winding directions of the detection coils S1 and S2 are opposite to each other. This causes the detection soil S1 and the exciting coil P1, as well as the detection coil S2 and the exciting coil P2 to be placed in the easy axis direction of the uniaxial anisotropy of the rotor 5, in case where a rotation angle of the rotor 5 is zero degrees, thus providing a strong connection. On the other hand, the detection soil S1 and the exciting coil P1, as well as the detection coil S2 and the exciting coil P2 are placed in the hard axis direction of the uniaxial anisotropy of the rotor 5, thus providing about a zero-connection.

An angle dependency of the connection coefficient "k" between the detection coil S1 and the exciting coil P1 as well as between the detection coil S2 and the exciting coil P2, which are aligned in the vertical direction, respectively, may be represented by "$k(\Theta)=k_0 \cos^2 \Theta + k_1$" (wherein, $\Theta$ being determined as zero degrees in the vertical direction). The magnetic fluxes generated by the exciting coils are referred to as "$\phi(P1)$" and "$\phi(P2)$", respectively. The connection from the exciting coil $P_i$ to the detection coil $S_j$ is referred to as "$k_{ji}(\Theta)$". The output S1-S2 may be represented as follows:

$$S1 - S2 = j\omega k_{11}(\theta)\phi(P1) + j\omega k_{12}(\theta)\phi(P2) - \\ (j\omega k_{21}(\theta)\phi(P1) + j\omega k_{22}(\theta)\phi(P2))$$

$$k_{11} = k_{22} = k_0 \cos^2\theta + k_1,$$

$$k_{12} = k_{21} = k_0 \cos^2\left(\frac{\pi}{2} - \theta\right) + k_1$$

Equation 2

From this equation, the output S1-S2 at an angle of zero degree may be expressed as follows:

$$S1 - S2 = j\omega k_0(\phi(P1) - \phi(P2)) \\ = 2j\omega k_0 \phi(P1)(\because \phi(P2) = -\phi(P1))$$

Equation 3 and the value becomes maximum (corresponding to FIG. 9(A)). In this case, there is no influence of the output due to "$k_1$" on the output, because of subtraction of it. There is a relationship of "$K_{11}=k_{22}=k_{12}=k_{21}$" at an angle of 45 degrees, and S1-S2 becomes zero (corresponding to FIG. 9(B)). Only the connection by $k_{12}$, $k_{21}$ takes place at an angle of 90 degrees, and the output S1-S2 (corresponding to FIG. 9(C)) may be represented as follows:

$$S1-S2=j\omega k_0(\phi(P2)-\phi(P1))=-2j\omega k_0\phi(P1)$$

Equation 4

In case of an angle of 135 degrees, the output becomes zero in the same manner as 45 degrees (corresponding to FIG. 9(D)), and in case of an angle of 180 degrees, the value is the same as that with the inversed sign of the output at an angle of zero degrees (corresponding to FIG. 9(E)). Consequently, an angle detection with a cycle of 180 degrees is permitted. FIG. 10 shows the output results of the angle detection apparatus according to this embodiment of the present innovation.

The back yoke 2 in this embodiment of the present innovation may be in the form of a disk member having substantially the same outer shape as the disk of the rotor 5, or be divided so as to cover at least the respective adjacent regions of the stators 3 divided into four.

In the angle detection apparatus according to this embodiment of the present application, the stator 3 is divided into four fan-shaped sections having substantially the same outer shape, the coils, which are wound around the outer peripheries of the set of the first fan-shaped section 3a and the third fan-shaped section 3c facing each other relative to the axis of disk member of the stator 3 are used as the detection coils 4a, 4c, the coils, which are wound around the outer peripheries of the other set of the second fan-shaped section 3b and the fourth fan-shaped section 3d facing each other are used as the exciting coils 4b, 4d, and the direction of the magnetic field excited by the exciting coil 4b of the second fan-shaped section 3b is opposite in polarity to the direction of the magnetic field excited by the exciting coil 4d of the fourth fan-shaped section 3d. Therefore, utilization of the combination of the exciting coils 4b, 4d and the detection coils 4a, 4c based on characteristic properties in the easy axis direction and the hard axis direction of the uniaxial anisotropy permits to make an angle detection with a cycle of 180 degrees.

Third Embodiment of the Present Innovation

Figure 11:
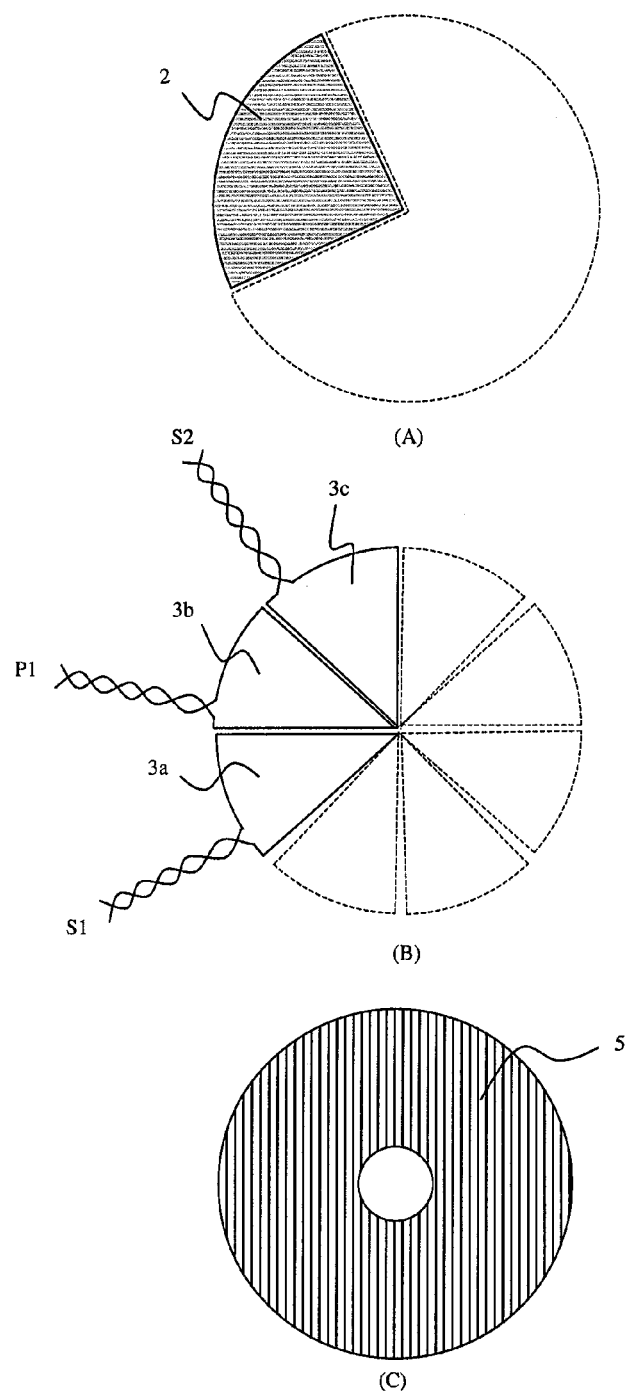
FIG. 11 includes a set of views illustrating respective parts of the angle detection apparatus according to the third embodiment of the present innovation.

The angle detection apparatus according to this embodiment of the present innovation will be described with reference to FIGS. 11 and 12. FIG. 11 includes a set of views illustrating respective parts of the angle detection apparatus according to the third embodiment of the present innovation and FIG. 12 includes a set of views showing output results of the angle detection apparatus according to the third embodiment of the present innovation.

The description, which overlaps with that according to the respective embodiments as described above, will be omitted in the description of the embodiment according to this embodiment of the present innovation.

The angle detection apparatus according to this embodiment of the present application has a structure in which the stator of the disk member is divided into eight fan-shaped sections having substantially the same outer shape, of the eight fan-shaped sections as divided, at least three fan-shaped sections are placed closely to each other so as to face the plane of the rotor in a combined state of the fan-shaped sections, and at least two detection coils and one exciting coil are would alternately along the outer peripheries of the three fan-shaped sections, respectively. In addition, the back yoke is provided on the opposite side to the rotor relative to the stator so as to face the disk member of the stator, and the back yoke is provided so as to cover at least a place in which the fan-shaped sections as divided are placed closely to each other.

FIG. 11(A) is a top plan view of the back yoke 2 of the angle detection apparatus according to this embodiment of the present innovation, FIG. 11(B) is a top plan view of the stator 3 of the angle detection apparatus according to this embodiment of the present innovation, and FIG. 11(C) is a top plan view of the rotor 5 of the angle detection apparatus according to this embodiment of the present innovation. The rotor 5 is formed of the disk member in the same manner as the respective embodiments as described above and has the uniaxial magnetic anisotropy in the direction of the plane thereof. The rotation of the rotor around the central point 5a in the plane of the disk may cause the direction of magnetization to change. The stator 3 is formed by closely placing at least three fan-shaped sections of the eight fan-shaped sections having substantially the same outer shape into which the disk member having substantially the same outer shape as the rotor 5 (the fan-shaped sections having a central angle of 45 degrees), as shown in FIG. 10(B) (the fan-shaped sections 3a~3c).

The detection coil and the exciting coil are alternately wound on the three fan-shaped sections 3a~3c, respectively. In this embodiment, the detection coil S1 is wound on the fan-shaped section 3a as divided, the exciting coil P1 is wound on the fan-shaped section 3b as divided, and the detection coil S2 is wound on the fan-shaped section 3c as divided.

The back yoke 2 may be formed of the disk member having substantially the same outer shape as the rotor 5. The back yoke may be provided so as to cover the adjacent region between the detection coil S1 and the exciting coil P1, as well as the adjacent region between the exciting coil P and the detection coil S2, which adjacent areas are required for a strong connection of the magnetic fields.

The formation of the stator 3 as shown in FIG. 11 causes a sine component to be detected in one adjacent region between the detection coil and the exciting coil, and a cosine component to be detected in the other adjacent region. In case where an inductive voltage from the exciting coil P1 to the detection coil S1 is caused by the magnetic connection generated at an angle of the rotor 5 of 180 degrees, the inductive voltage from the exciting coil P1 to the detection coil S1 causes the voltage, which is caused by the magnetic connection generated at an angle of the rotor 5 of 135 degrees, to be detected.

More specifically, taking into consideration the difference in coefficient due to the difference in shape of the coil in comparison with the second embodiment as described above, the output voltage of the detection coil S1 and the output voltage of the detection coil S2 may be represented as follows:

$$S1 = j\omega m_{11}(\theta)\phi(P1) = j\omega(m_0\cos^2\theta + m_1)\phi(P1) \quad \text{Equation 5}$$
$$S2 = j\omega m_{12}(\theta)\phi(P1) = j\omega\left(m_0\cos^2\left(\theta + \frac{\pi}{4}\right) + m_1\right)\phi(P1)$$

wherein, "m1" and "m0" being coefficients corresponding to "k1" and "k0".

Figure 12:
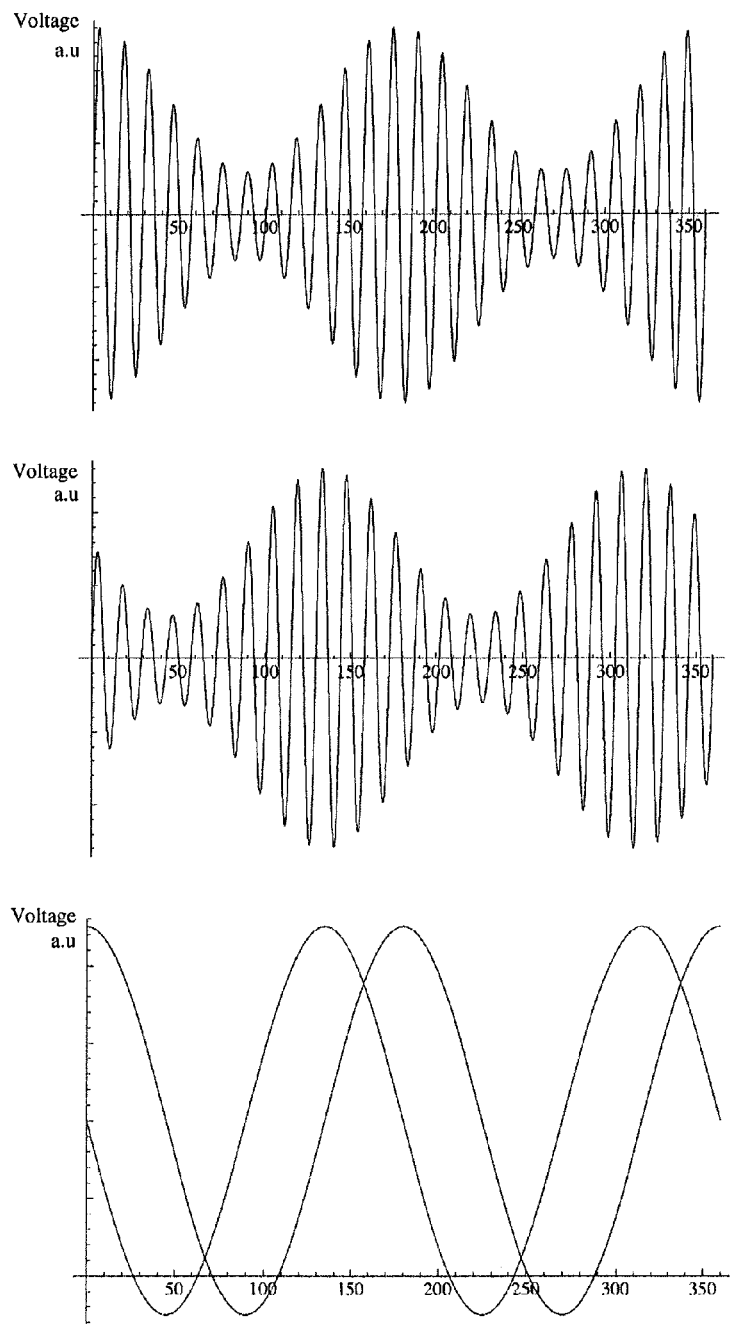
FIG. 12 includes a set of views showing output results of the angle detection apparatus according to the third embodiment of the present innovation.

FIG. 12 shows the output waveform of the detection coil S1 and the output waveform of the detection coil S2, as well as the demodulated waveforms of them. FIG. 12(A) shows the output waveform of the detection coil S1, FIG. 12(B) shows the output waveform of the detection coil S2, and FIG. 12(C) shows the demodulated waveforms of these waveforms. The respective waveforms have sine and cosine relationships as shown in FIG. 12(C). More specifically, obtaining an arc tangent of the biphase output voltages makes it possible to detect precisely the angle in an easy manner utilizing dedicated integrated circuits, etc.

In the angle detection apparatus according to this embodiment of the present application, the stator 3 is divided into the eight fan-shaped sections having substantially the same outer shape, of the eight fan-shaped sections as divided, at least three fan-shaped sections are placed closely to each other so as to face the plane of the rotor in a combined state of the fan-shaped sections, and two of the detection coils S1 and S2 and one of the exciting coil P1 are wound alternately along the outer peripheries of the three fan-shaped sections as provided. This makes it possible to detect accurately the sine component and the cosine component by the minimum needed number of parts of the stator 3, thus providing an effect of detecting an angle of the rotor 5 with a high degree of accuracy. Especially, the configuration in which dedicated integrated circuits are used to obtain the arc tangent of the biphase output voltage may provide an effect of simplifying a manufacturing process to improve the manufacture efficiency.

In addition, the back yoke 2 is provided on the opposite side to the rotor 5 relative to the stator 3 so as to face the disk member of the stator 3, and the back yoke is provided so as to cover at least the place in which the fan-shaped sections as divided are placed closely to each other. This structure in which the back yoke 2 is placed only the region having the strongest connection between the coils may provide an effect of maintain a detection accuracy of angle by the minimum needed area of the back yoke 2.

Fourth Embodiment of the Present Innovation

Figure 13:
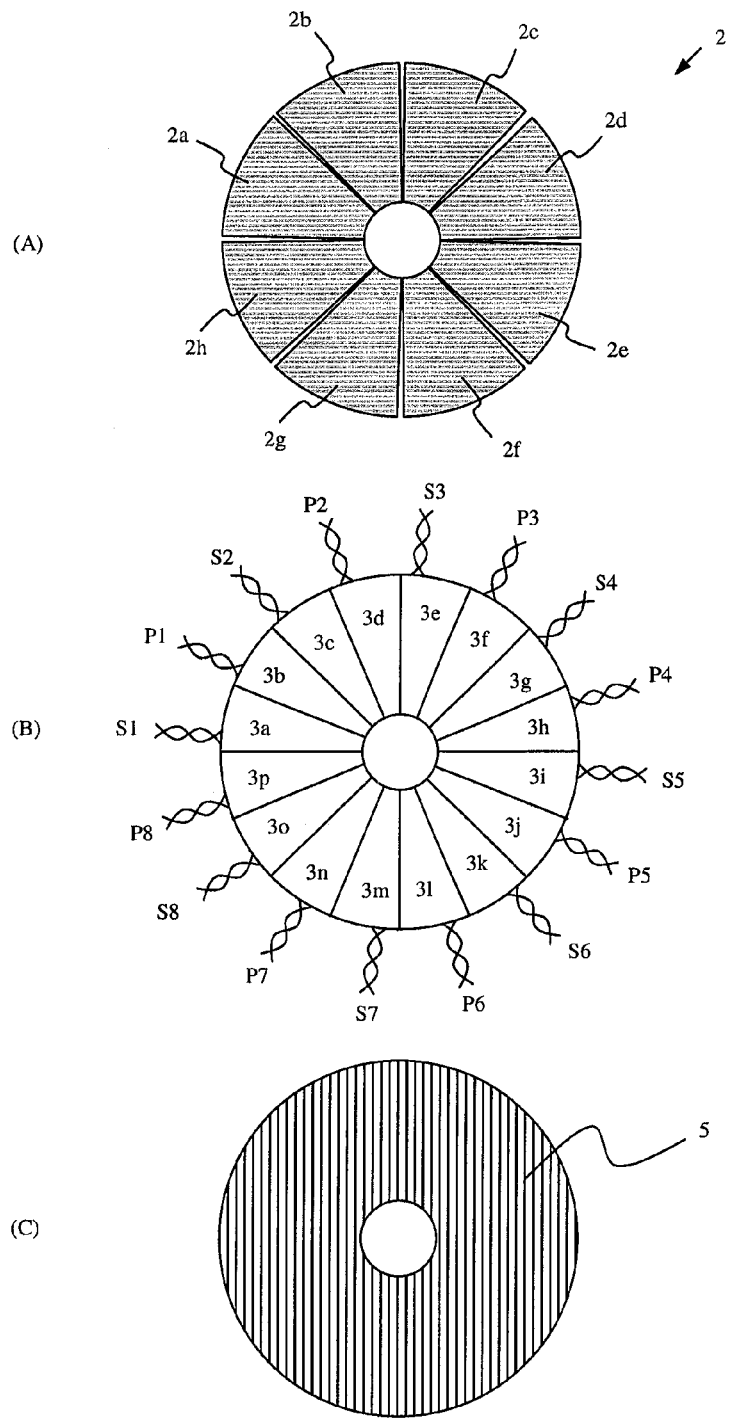
FIG. 13 includes a set of views illustrating respective parts of the angle detection apparatus according to the fourth embodiment of the present innovation.
Figure 14:
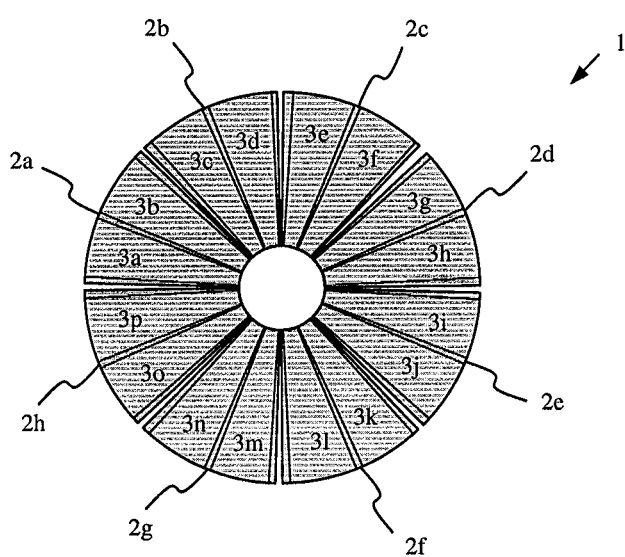
FIG. 14 is a top plan view in case where the respective parts of the angle detection apparatus according to the fourth embodiment of the present innovation are assembled together.

The angle detection apparatus according to this embodiment of the present innovation will be described with reference to FIGS. 13 and 14. FIG. 13 includes a set of views illustrating respective parts of the angle detection apparatus according to the fourth embodiment of the present innovation, and FIG. 14 is a top plan view in case where the respective parts of the angle detection apparatus according to the fourth embodiment of the present innovation are assembled together The description, which overlaps with that according to the respective embodiments as described above, will be omitted in the description of the embodiment according to this embodiment of the present innovation.

In the angle detection apparatus according to this embodiment of the present application, the stator 3 is divided into sixteen fan-shaped sections having substantially the same outer shape, of a set of eight fan-shaped sections as placed closely to each other, a set of four fan-shaped sections, which face each other in a cruciform relationship relative to the central point of the stator, detects a sine component, and other set of four fan-shaped sections detects a cosine component. In addition, a back yoke 2 is provided on the opposite side to the rotor 5 relative to the stator 3, so as to face the disk member of the stator 3. The back yokes 2 is composed of eight fan-shaped sections having substantially the same outer shape so as to correspond to the set of eight fan-shaped sections of the stator 3. A gap is provided between the respective adjacent fan-shaped sections of the back yoke 2.

FIG. 13(A) is a top plan view of the back yoke 2 of the angle detection apparatus according to this embodiment of the present innovation, FIG. 13(B) is a top plan view of the stator 3 of the angle detection apparatus according to this embodiment of the present innovation and FIG. 13(C) is a top plan view of the rotor 5 of the angle detection apparatus according to this embodiment of the present innovation. In the embodiment of the present innovation, the stator 3 is divided into sixteen fan-shaped sections having substantially the same outer shape, as shown in FIG. 13, detection coils (S1~S8) and exciting coils (P1~P8) are would on the fan-shaped sections as placed adjacently so as to form eight sets of the stator ((3a, 3b), (3c, 3d), (3e, 3f), (3g, 3h), (3i, 3j), (3k, 3l), (3m, 3n) and (3o, 3p)). The back yoke 2 is divided into the eight fan-shaped sections (2a~2h) so as to correspond these eight sets of the stator and a gap is provided between the respective adjacent fan-shaped sections of the back yoke.

The rotor 5 is formed of the disk member in the same manner as the respective embodiments as described above and has the uniaxial magnetic anisotropy in the direction of the plane thereof. The rotation of the rotor around the central point 5a in the plane of the disk may cause the direction of magnetization to change.

FIG. 14 shows a state in which the back yoke 2, the stator 3 and the rotor 5 as described above are combined in a stacked state. As shown in FIG. 14, one set of the fan-shaped sections (e.g., (3a, 3b) of the stator 3 corresponds to one fan-shaped section (e.g., 2a) of the back yoke and the back yoke 2 (the fan-shaped section 2a) enhances the magnetic connection of the set of the detection coil (e.g., S1) and the exciting coil (e.g., P1). The gap is provided between the adjacent fan-shaped sections of the back yoke for an area between the sets (e.g., between the set (3a, 3b) and the set (3c, 3d)), resulting in an extremely weak connection between the detection coil (S2) and the exciting coil (P1).

More specifically, the configuration as shown in FIG. 14 enables the four sets of fan-shaped sections ((3a, 3b), (3e, 3f), (3i, 3j), (3m, 3n)), which are placed so as to face each other relative to the central point in predetermined diameter directions of the disk member, to detect a sine component, and the other sets of fan-shaped sections ((3c, 3d), (3g, 3h), (3k, 3l), (3o, 3p)), which are placed so as to face each other relative to the central point in the other predetermined diameter directions of the disk member, to detect a cosine component. Obtaining an arc tangent of the biphase output voltages makes it possible to detect precisely the angle in an easy manner utilizing dedicated integrated circuits, etc.

In the angle detection apparatus according to this embodiment of the present application, the stator 3 is divided into the sixteen fan-shaped sections having substantially the same outer shape, the exciting coils and the detection coils are alternately wound on the adjacent fan-shaped sections and, of the eight fan-shaped sections as adjacently placed, the four sets of fan-shaped sections, which are placed so as to face each other in the predetermined diameter directions of the disk member, are capable of detecting the sine component and the other four sets of fan-shaped sections are capable of detecting the cosine component, thus permitting to obtain an angle of rotation in an easy manner based on these biphase signal. Particularly, a configuration of obtaining an arc tangent of the biphase output voltages utilizing dedicated integrated circuits, etc. make it possible to provide an effect of simplifying a manufacturing process to improve the manufacture efficiency.

In addition, the back yoke is divided into eight fan-shaped sections having substantially the same outer shape so as to correspond to the set of eight fan-shaped sections of the stator, and the gap is provided between adjacent two of the fan-shaped sections. Consequently, the back yoke is placed only a region having the strongest connection between the coils, thus permitting to provide effects of maintain a detection accuracy of angle by the back yoke composed of the minimum needed parts thereof.

Fifth Embodiment of the Present Innovation

Figure 15:
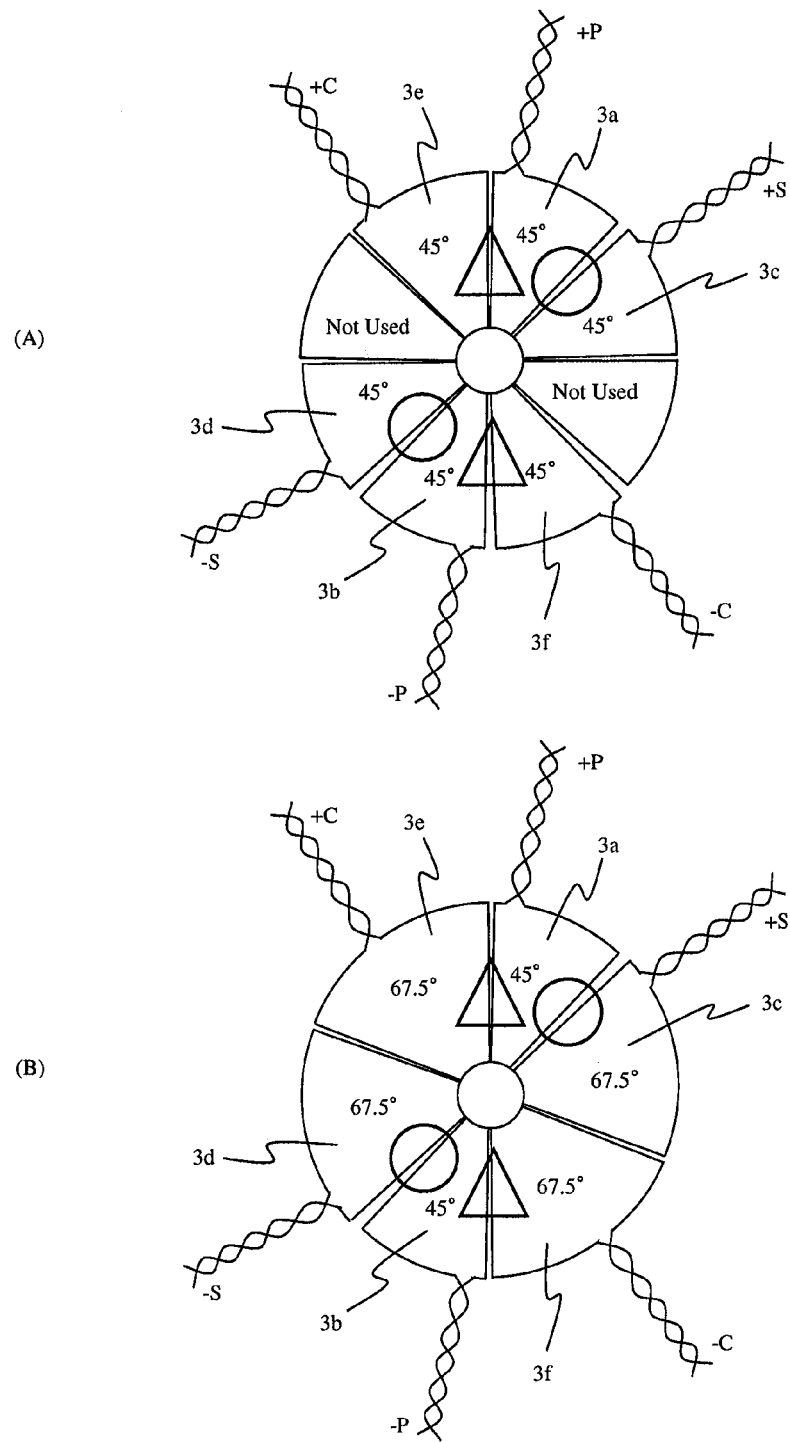
FIG. 15 includes a set of views illustrating a stator of the angle detection apparatus according to the fifth embodiment of the present innovation.

The angle detection apparatus according to this embodiment of the present innovation will be described with reference to FIG. 15. FIG. 15 includes a set of views illustrating a stator of the angle detection apparatus according to the fifth embodiment of the present innovation.

The description, which overlaps with that according to the respective embodiments as described above, will be omitted in the description of the embodiment according to this embodiment of the present innovation.

As shown in FIG. 15(A), in the angle detection apparatus according to this embodiment, the stator 3 is divided into a plurality of fan-shaped sections (hereinafter referred to as the "divided fan-shaped sections"), and of the fan-shaped divided sections, the divided fan-shaped sections 3a, 3b for excitation having a central angle of 45 degrees are provided so as to face each other relative to the center of the disk member (so as to be symmetrical with respect to the central point of the disk member). The divided fan-shaped sections 3a, 3b for excitation are provided at the respective outer peripheries thereof with exciting coils "+P" and "-P" so as to generate magnetic fields, which are opposite to each other in polarity.

The two divided fan-shaped sections, which are placed adjacently to the divided fan-shaped sections 3a, 3b for excitation and so as to face each other relative to the center of the disk member, are used as the sine detection fan-shaped sections 3c, 3d. The sine detection fan-shaped sections 3c, 3d are provided at the respective outer peripheries thereof with detection coils "+S" and "-S" for detecting a signal of the sine component so as to be opposite to each other in polarity.

The two divided fan-shaped sections, which are placed adjacently to the divided fan-shaped sections 3a, 3b for excitation and so as to face each other relative to the center of the disk member, so that the divided fan-shaped sections 3a, 3b for excitation are placed between the sine detection fan-shaped sections 3c, 3d, are used as the cosine detection fan-shaped sections 3e, 3f. The cosine detection fan-shaped sections 3e, 3f are provided at the respective outer peripheries thereof with detection coils "+C" and "-C" for detecting a signal of the cosine component so as to be opposite to each other in polarity.

The output of the sine component is detected a position with a symbol of "○" as shown in FIG. 15 and the output of the cosine component is detected a position with a symbol of "Δ" as shown in this figure. The sine component "v" (S/P) of the sine component may be represented by:

$$v(S/P) = 2j\omega\phi(k_0 + k_1 \cos^2(\theta + \frac{\pi}{4}))$$ Equation 6 and the output V (C/P) of the cosine component may be represented by:

$$v(C/P) = 2j\omega\phi(k_0 + k_1 \cos^2(\theta))$$ Equation 7

In FIG. 15(A), the respective central angles of the sine detection fan-shaped sections 3c, 3d and the cosine detection fan-shaped sections 3e, 3f are set as 45 degrees and the fan-shaped sections 3g, 3h are set as the not-used area. However, the respective central angles of the sine detection fan-shaped sections 3c, 3d and the cosine detection fan-shaped sections 3e, 3f may be set as 67.5 degrees as shown in FIG. 15(B).

The rotor 5 according to this embodiment of the present innovation is formed of the disk member in the same manner as the respective embodiments as described above and has the uniaxial magnetic anisotropy in the direction of the plane thereof. The rotation of the rotor around the central point 5a in the plane of the disk may cause the direction of magnetization to change.

The back yoke 2 is provided on the opposite side to the rotor 5 relative to the stator 3, so as to face the disk member of the stator 3. The back yoke 2 is formed of the disk member, which has the same outer shape as the disk member of the stator 3.

Sixth Embodiment of the Present Innovation

Figure 16:
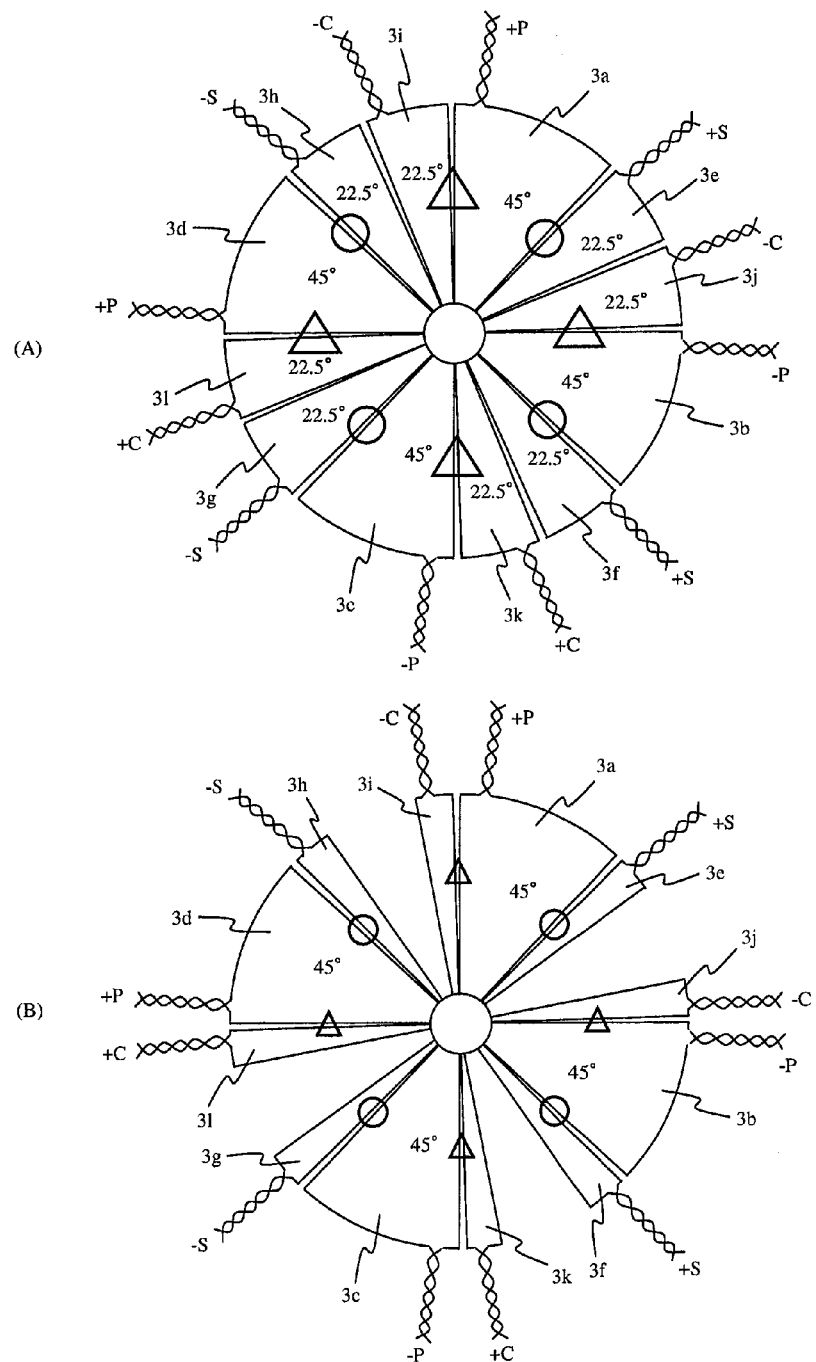
FIG. 16 includes a first set of views illustrating a stator of the angle detection apparatus according to the fifth embodiment of the present innovation.

The angle detection apparatus according to this embodiment of the present innovation will be described with reference to FIGS. 16 to 19. FIG. 16 includes the first set of views illustrating the stator of the angle detection apparatus according to the fifth embodiment of the present innovation, FIG. 17 includes the second set of views illustrating the stator of the angle detection apparatus according to the fifth embodiment of the present innovation, FIG. 18 includes a set of views illustrating a back yoke of the angle detection apparatus according to the sixth embodiment of the present innovation, and FIG. 19 includes a set of views showing output results of the angle detection apparatus according to the sixth embodiment of the present innovation.

The description, which overlaps with that according to the respective embodiments as described above, will be omitted in the description of the embodiment according to this embodiment of the present innovation.

As shown in FIG. 16(A), in the angle detection apparatus according to this embodiment, the stator 3 is divided into a plurality of fan-shaped sections (hereinafter referred to as the "divided fan-shaped sections"), and of the fan-shaped divided sections, the four divided fan-shaped sections 3a, 3b, 3c, 3d for excitation having a central angle of 45 degrees are provided so as to face each other in a cruciform relationship relative to the center of the disk member (so as to be symmetrical with respect to the central point of the disk member). The divided fan-shaped sections 3a, 3b, 3c, 3d for excitation are provided at the respective outer peripheries thereof with exciting coils "+P" (the divided fan-shaped sections 3a, 3d for excitation) and "−P" (the divided fan-shaped sections 3b, 3c for excitation) so that the divided fan-shaped sections for excitation (the divided fan-shaped sections 3a, 3d for excitation, or the divided fan-shaped sections 3b, 3c for excitation), which are placed so as to face each other relative to the center of the disk member, generate magnetic fields, which are opposite to each other in polarity.

In addition, the four divided fan-shaped sections, which are placed adjacently to the divided fan-shaped sections 3a, 3b, 3c, 3d for excitation and face each other in a cruciform relationship relative to the center of the disk member, are used as the sine detection fan-shaped sections 3e, 3f, 3g, 3h. The sine detection fan-shaped sections 3e, 3f, 3g, 3h are provided at the respective outer peripheries thereof with detection coils "+S" (the sine detection fan-shaped sections 3e, 3f) and "−S" (the sine detection fan-shaped sections 3g, 3h) for detecting signals of the sine component so that the sine detection fan-shaped sections (the sine detection fan-shaped sections 3e and 3g, or the sine detection fan-shaped sections 3f and 3h), which are placed so as to face each other relative to the center of the disk member, are opposite to each other in polarity.

Further, there are provided, as the cosine detection fan-shaped sections 3i, 3j, 3k, 3l, the four divided fan-shaped sections, which are placed so as to face each other in a cruciform relationship relative to the center of the disk member, and placed adjacently to the divided fan-shaped sections 3a, 3b, 3c, 3d for excitation so that the divided fan-shaped sections. 3a, 3b, 3c, 3d for excitation are placed between the sine detection fan-shaped sections 3e, 3f, 3g, 3h, respectively. The cosine detection fan-shaped sections 3i, 3j, 3k, 3l are provided at the respective outer peripheries thereof with detection coils "+C" (the cosine detection fan-shaped sections 3k, 3l) and "−C" (the cosine detection fan-shaped sections 3i, 3j) for detecting signals of the cosine component so that the cosine detection fan-shaped sections (the cosine detection fan-shaped sections 3i and 3k, or the cosine detection fan-shaped sections 3j and 3l), which are placed so as to face each other relative to the center of the disk member, are opposite to each other in polarity.

The output of the sine component is detected a position with a symbol of "○" as shown in FIG. 16 and the output of the cosine component is detected a position with a symbol of "Δ" as shown in this figure. More specifically, such a structure enables only the connection between the adjacent exciting coil and detection coil (between ±P and ±S, and between ±P and ±C) to be made and disables the connection between the detection coils (between ±S and ±C) from being made.

On the assumption that the output voltages from the respective coils are "v(Si/Pj)", "v(Ci/Pj)"(wherein, "I" being the number of the detection coil, "j", the number of the exciting coil), the output voltages "v" of the sine component may be represented as follows:

$$v(S_1/P_1) = j\omega\phi(k_0 + k_1\cos^2(\theta - \frac{\pi}{4}))$$
$$v(S_2/P_2) = -j\omega\phi(k_0 + k_1\cos^2(\theta - (\frac{\pi}{4} + \frac{\pi}{2})))$$
$$v(S_3/P_3) = j\omega\phi(k_0 + k_1\cos^2(\theta - \frac{\pi}{4}))$$
$$v(S_4/P_4) = -j\omega\phi(k_0 + k_1\cos^2(\theta - (\frac{\pi}{4} + \frac{\pi}{2})))$$

Equation 8

The sine output may be obtained from the sum of the voltages as follows:

Equation 9

$$v(S_1/P_1)+v(S_2/P_2)+v(S_3/P_3)+v(S_4/P_4)=2j\omega\theta k_1 \sin(2\theta) \qquad (1)$$

The output voltages "v" of the cosine component may be represented in the same manner as follows:

$$v(C_1/P_1) = j\omega\phi(k_0 + k_1\cos^2(\theta - \frac{\pi}{2}))$$
$$v(C_2/P_2) = -j\omega\phi(k_0 + k_1\cos^2(\theta))$$
$$v(C_3/P_3) = j\omega\phi(k_0 + k_1\cos^2(\theta - \frac{\pi}{2}))$$
$$v(C_4/P_4) = -j\omega\phi(k_0 + k_1\cos^2(\theta))$$

Equation 10

The cosine output may be obtained from the sum of the voltages as follows:

Equation 11

$$v(C_1/P_1)+v(C_3/P_3)+v(C_2/P_2)+v(C_4/P_4)=-2j\omega\theta k_1 \cos(2\theta) \qquad (2)$$

In the structure as shown in FIG. 16(A), the central angle of the divided fan-shaped sections 3a, 3b, 3c, 3d for excitation is set as 45 degrees and the central angle of the sine detection fan-shaped sections 3e, 3f, 3g, 3h and the cosine detection fan-shaped sections 3i, 3j, 3k, 31 is set as 22.5 degrees. However, the central angle of the sine detection fan-shaped sections 3e, 3f, 3g, 3h and the cosine detection fan-shaped sections 3i, 3j, 3k, 31 may be set as an angle equal to or less than 22.5 degrees, as shown in FIG. 16(B), as long as they are placed adjacently to the divided fan-shaped sections 3a, 3b, 3c, 3d for excitation.

Figure 17:
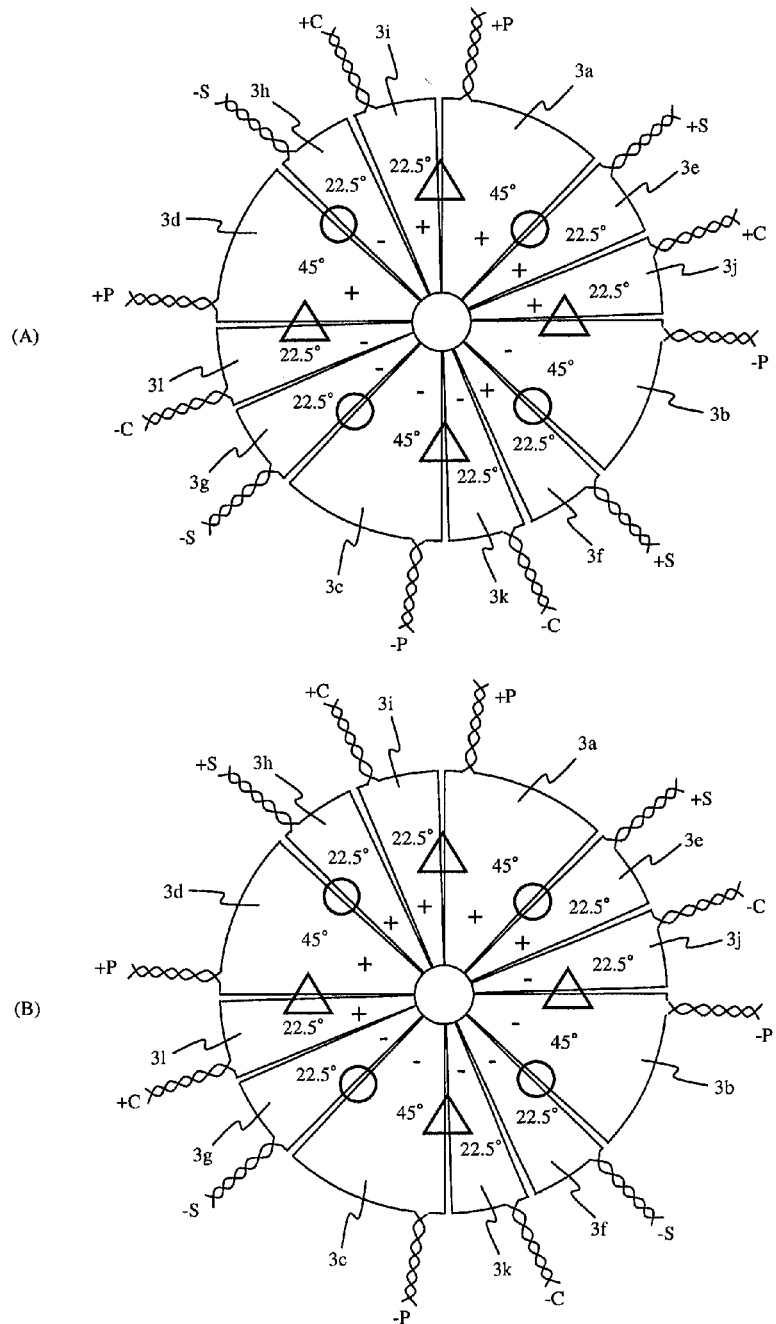
FIG. 17 includes a second set of views illustrating the stator of the angle detection apparatus according to the fifth embodiment of the present innovation.

In addition, the combination of the symbols (+, −) may not be limited only to that as shown in FIG. 16. There suffices a structure in which a coefficient "$k_0$", which is not dependent from the angle in Equations (1) and (2) as indicated above, may be cancelled as shown for example in FIGS. 17(A), (B), and there suffices an arrangement and polarity in which the value "$k_0$" may be cancelled by adding or subtracting the value of "v(Si/Pj)" or "v(Ci/Pj)". More specifically, there suffices a structure in which the exciting coils are composed of two coils having a positive polarity and two coils having a negative polarity, two coils of the coils for detecting the sine component are placed so as to be positive, and the other two coils are placed so as to be negative, and two coils of the coils for detecting the cosine component are placed so as to be positive, and the other two coils are placed so as to be negative. The combination as described above makes it possible to detect simultaneously the sine component and the cosine component by adjusting the addition or subtraction (a wire connection) of "v(Si/Pj)" or "v(Ci/Pj)". Making the fan-shaped sections, which are provided so as to face each other relative to the central point of the stator (so as to be symmetrical with respect to the central point), opposite to each other in polarity as shown in FIGS. 16 and 17, permits the fluxes of the exciting coils to be restricted, thus preventing them from being expanded far to make it hard to cause interference with the other device. In addition, concerning the detection coil, an influence of the external magnetic noise may cause inductive voltages which have the same intensity and are opposite to each other in polarity, in the set of two opposing detection coils, and they may be cancelled by a wire connection in series. Therefore, it is preferable to place the fan-shaped sections to face each other relative to the central point of the stator so as to be opposite to each other in polarity.

The rotor 5 in this embodiment of the present innovation is formed of the disk member in the same manner as the respective embodiments as described above and has the uniaxial magnetic anisotropy in the direction of the plane thereof. The rotation of the rotor around the central point 5a in the plane of the disk may cause the direction of magnetization to change.

Figure 18:
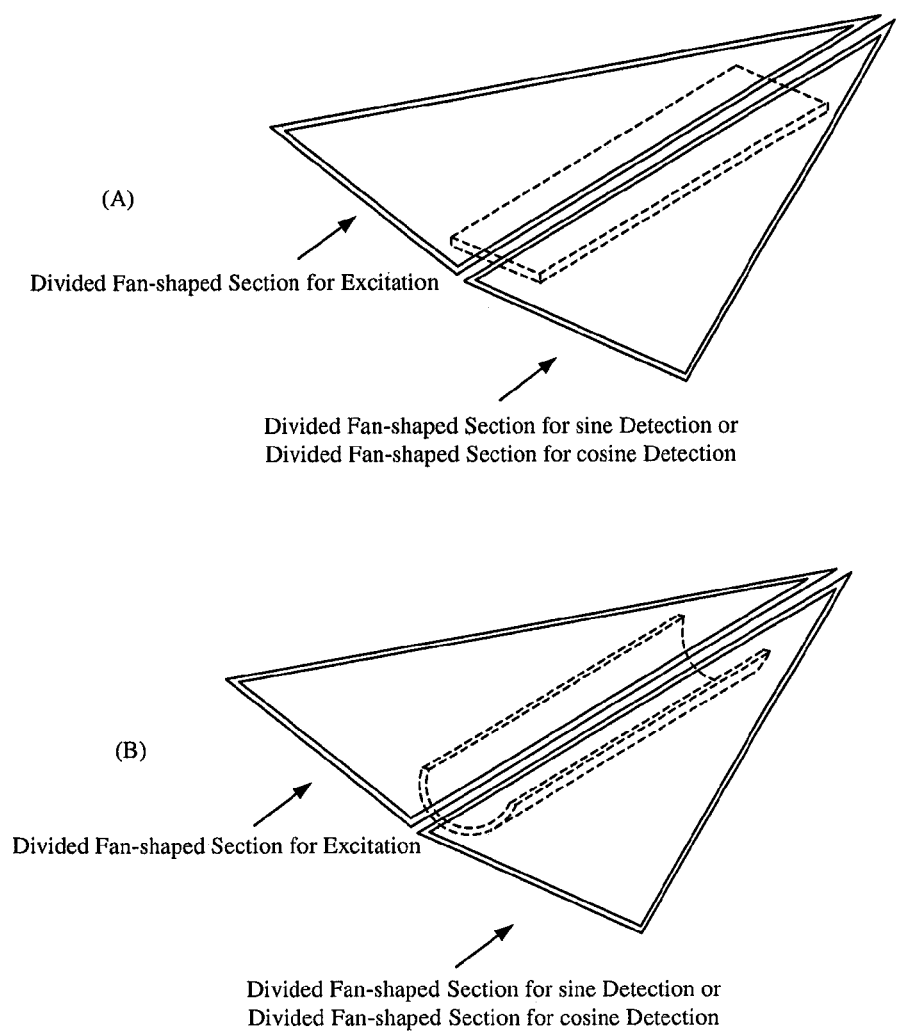
FIG. 18 includes a set of views illustrating a back yoke of the angle detection apparatus according to the sixth embodiment of the present innovation.

The back yoke 2 is provided on the opposite side to the rotor 5 relative to the stator 3, so as to face the disk member of the stator 3. The back yoke 2 may be formed of the disk member, which has the same outer shape as the disk member of the stator 3. Alternatively, the back yoke 2 may be provided at an adjacent position between the divided fan-shaped section for excitation and the sine detection divided fan-shaped section or the cosine detection divided fan-shaped section, as shown in FIG. 18. The back yoke 2 may have the plate-like shape as shown in FIG. 18(A) or a semicylindrical shape as shown in FIG. 18(B).

Figure 19:
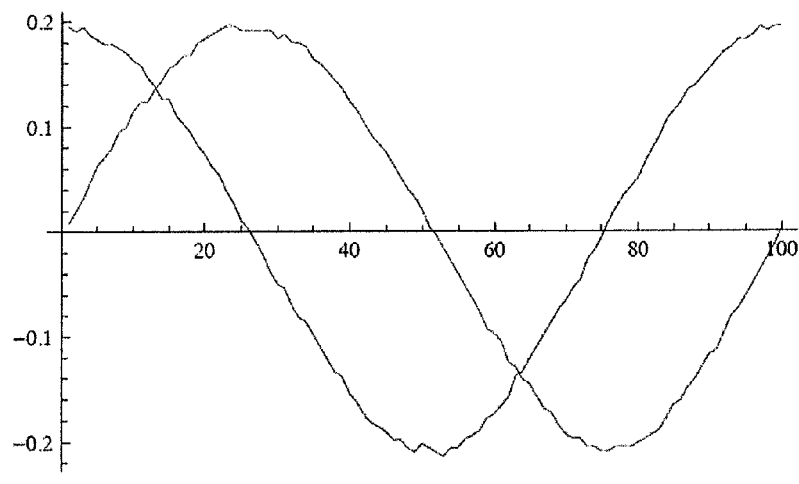
FIG. 19 includes a set of views showing output results of the angle detection apparatus according to the sixth embodiment of the present innovation.
Figure 19:
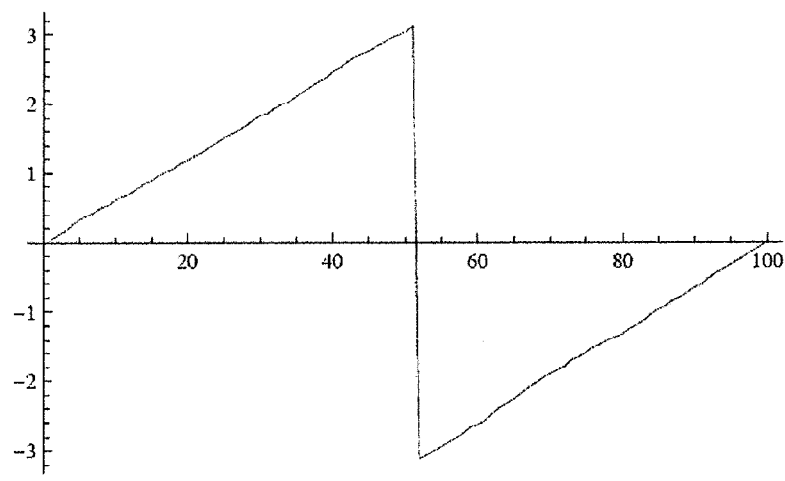

FIG. 19 includes a set of views showing output results of the angle detection apparatus according to the sixth embodiment of the present innovation. Here, the coil is of 100 turns. In FIG. 19(A), an ordinate is indicative of an output voltage, and an abscissa is indicative of an angle in which the mechanical angle of 180 degree is represented as "100". FIG. 19(B) shows an angle in which the value of an arc tangent (sin/cos) is calculated based on the output as shown in FIG. 19(A). As is clear from these results, the respective waveforms of FIG. 19(A) are indicative of outputs of the sine component and the cosine component, and obtaining the arc tangent of these biphase output voltages makes it possible to detect precisely the angle in an easy manner utilizing dedicated integrated circuits, etc.

Seventh Embodiment of the Present Innovation

Figure 20:
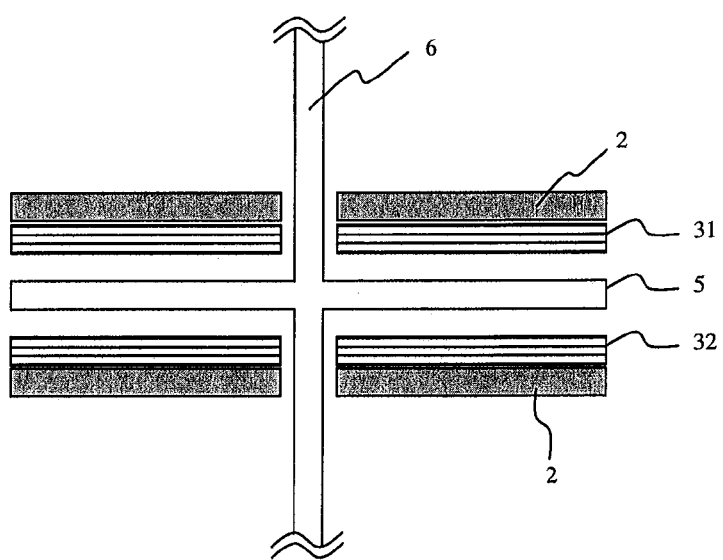
FIG. 20 is a cross-sectional view of the angle detection apparatus according to the seventh embodiment of the present innovation.

The angle detection apparatus according to this embodiment of the present innovation will be described with reference to FIGS. 20 to 22. FIG. 20 is a cross-sectional view of the angle detection apparatus according to the seventh embodiment of the present innovation, FIG. 21 is the first view illustrating a structure of the stator and the rotor of the angle detection apparatus according to the seventh embodiment of the present innovation, and FIG. 22 is the second view illustrating a structure of the stator and the rotor of the angle detection apparatus according to the seventh embodiment of the present innovation.

The description, which overlaps with that according to the respective embodiments as described above, will be omitted in the description of the embodiment according to this embodiment of the present innovation.

The angle detection apparatus according to this embodiment of the present innovation uses the two stators, as shown in FIG. 8(B), to detect the sine component and the cosine component. FIG. 20 shows the cross-section of the angle detection apparatus. The rotor 5 is jointed at the central point thereof to the rotation shaft 6 so that the rotor 5 rotates along with the rotation of the rotation shaft in the plane of the disk member. The stators 31, 32 having substantially the same outer shape are placed so as to face the disk member of the rotor 5 in a non-contact state. The back yoke 2 may be provided in a contact or non-contact state with the stator, so as to face the surface of the stator 3 on the opposite side of which surface the rotor 5 is placed.

Figure 21:
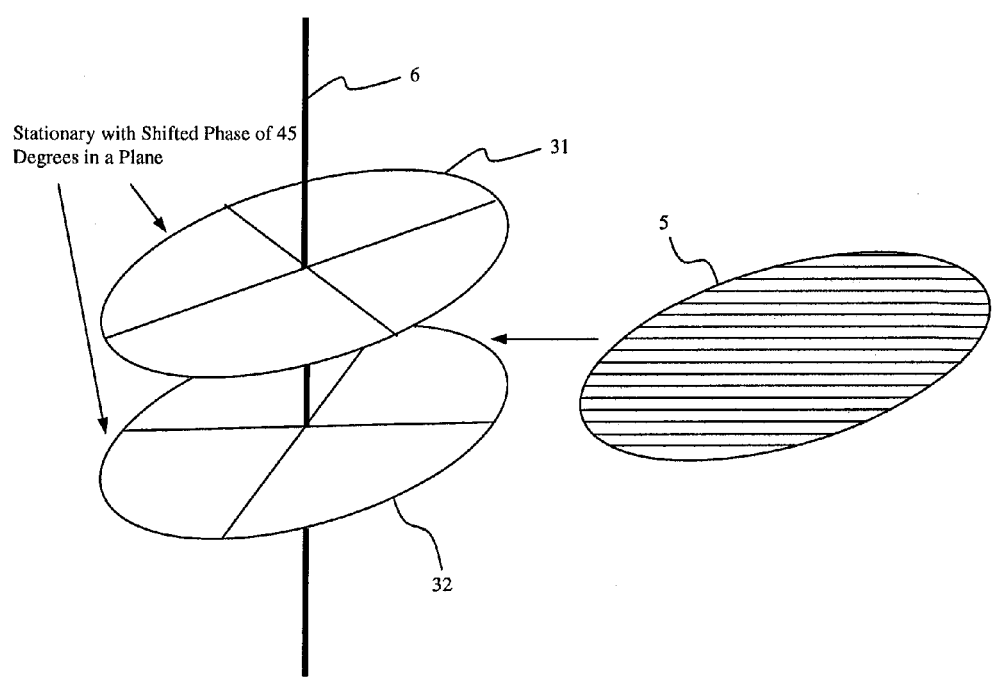
FIG. 21 is a first view illustrating a structure of a stator and a rotor of the angle detection apparatus according to the seventh embodiment of the present innovation.
Figure 22:
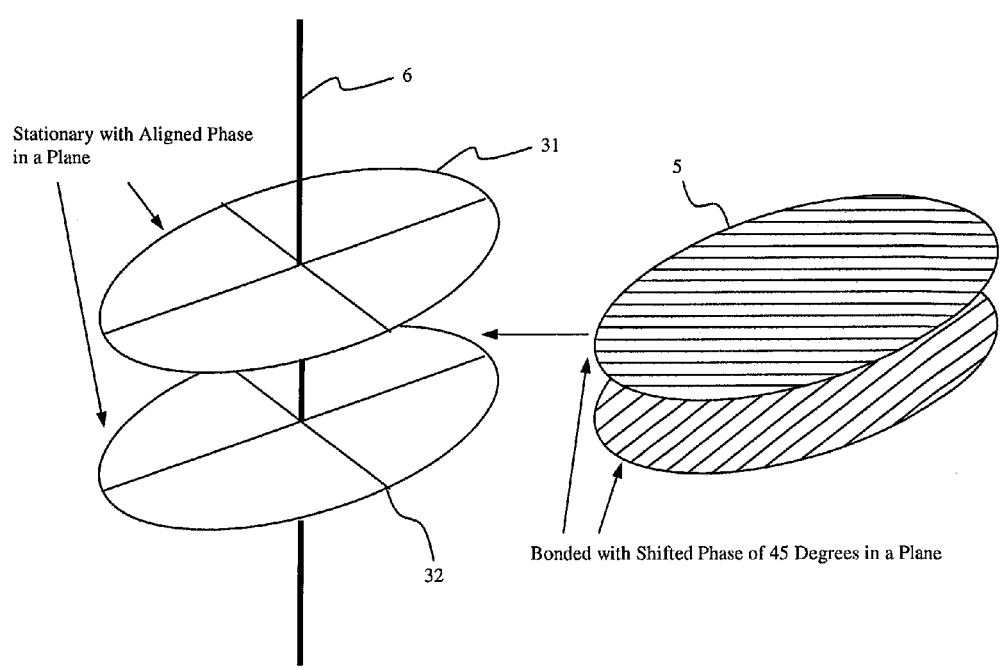
FIG. 22 is a second view illustrating a structure of a stator and a rotor of the angle detection apparatus according to the seventh embodiment of the present innovation.

FIG. 21 shows an arrangement of the stators 31, 32 and the rotor 5, which are shown in FIG. 20. As shown in FIG. 21, the stators 31, 32 (each of which is composed of four divided fan-shaped sections having the central angle of 90 degrees) as shown in FIG. 8(B) are placed with a shifted phase of 45 degrees in the respective plane. The rotor 5 having a uniaxially magnetic anisotropy rotates between the stators 31, 32, with the result that the one stator detects the sine component and the other stator detects the cosine component. The stators 31, 32 are capable of detecting the component of suppressing the modulation wave. Therefore, by the angle detection apparatus according to this embodiment of the present innovation, it is possible to make an angle detection with an extremely high degree of accuracy.

The angle detection apparatus according to this embodiment of the present innovation may have the structure as shown in FIG. 22 indicated below. In the structure as shown in FIG. 20, the stators 31, 32 are provided with an aligned phase, and the rotor 5 is placed between the stators 31, 32 with a shifted uniaxial anisotropy of 45 degrees in a plane and bonded to the stators. The anisotropy of the rotor 5 is shifted by an angle of 45 degrees, with the result that the rotation of the rotor enables the sine component to be detected by the one stator, and the cosine component to be detected by the other stator.

In the respective embodiments as described above of the present innovation, the exciting coil and the detection coil may be provided on the whole of the side surface of the fan-shaped sections of the stator, or provided only in at least linear portion.

The respective embodiments of the present innovation have been described above. However, the scope of the present innovation is not limited only to the ranges described in the embodiments and various alternatives or modifications to these embodiments of the innovation may be employed.

Eighth Embodiment of the Present Innovation

Figure 23:
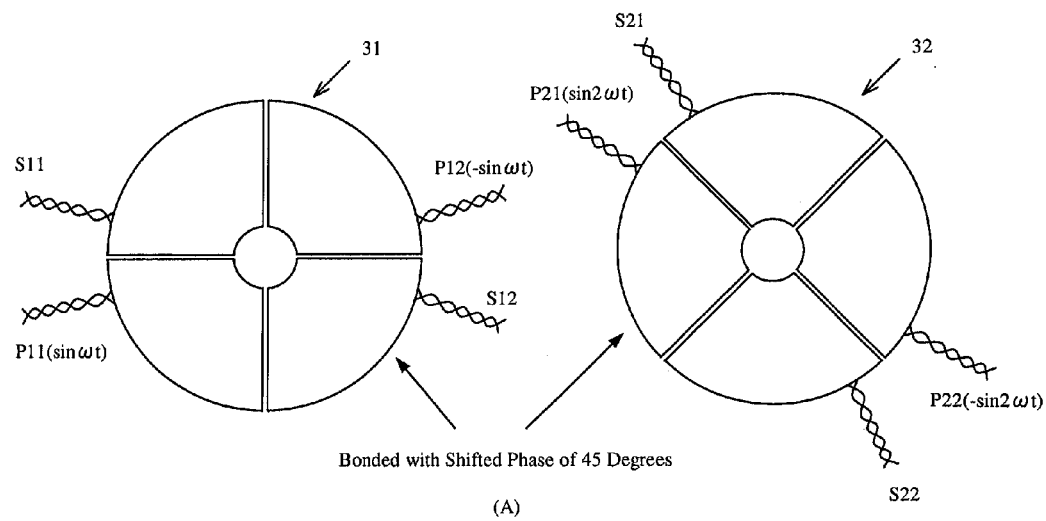
FIG. 23 includes a set of views illustrating a stator of the angle detection apparatus according to the eighth embodiment of the present innovation and illustrating a cross-section thereof.
Figure 23:
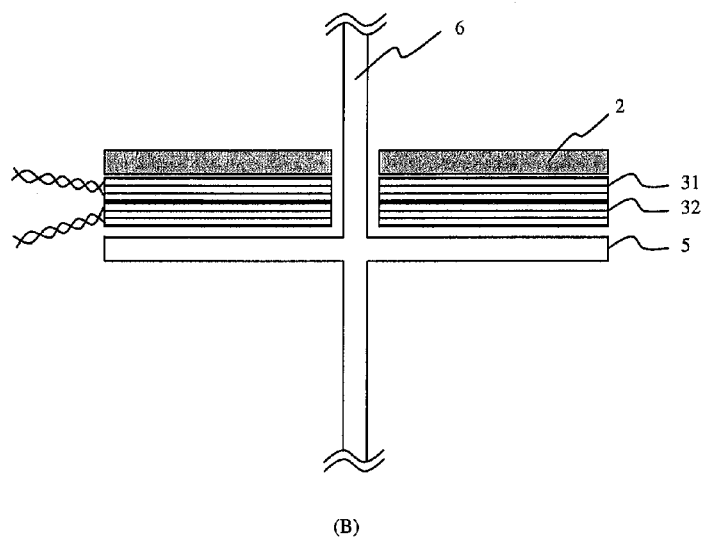

The angle detection apparatus according to this embodiment of the present innovation will be described with reference to FIG. 23. FIG. 23 includes a set of views illustrating a stator of the angle detection apparatus according to the eighth embodiment of the present innovation and illustrating a cross-section thereof.

The description, which overlaps with that according to the respective embodiments as described above, will be omitted in the description of the embodiment according to this embodiment of the present innovation.

The angle detection apparatus according to this embodiment of the present innovation, which uses two stators 3 to detect the sine component and the cosine component in the same manner as the angle detection apparatus according to the seventh embodiment of the present innovation. As shown in FIG. 23(A), there is used a unit in which the stators divided into four as shown in FIG. 8 are bonded with a shifted angle of 45 degrees (stators 31, 32), and the rotor 5 and the back yoke 2 are provided so as to face the stators as shown in FIG. 23(B). An electric current for excitation of for example sin ωt is input to a system of P1, and an electric current for excitation of for example sin 2ωt is input to a system of P2. At this time, a synchronized detection is made to prevent interference between sin ωt of the system P1 and sin 2ωt of the system P2.

In FIG. 23, the frequency f2 of the system P2 is set as being twice as much as the frequency f1 of the system P1. However, the different frequencies of them (e.g., f1−f2>about 100 Hz) may provide a proper separation. Alternatively, there may be applied a configuration in which the electric current of sin ωt (or cos ωt) is input to the system P1 and the electric current of cos ωt (or sin ωt) is input to the system P2.

There is a phase difference of 90 degrees caused between the voltage output from the system S1 and the voltage output from the system S2, and the phases thereof are used as the "sine phase" and the "cosine phase", respectively. Such a configuration permits to obtain a sine waveform with less distortion, thus achieving a high accuracy angle detection apparatus.

Ninth Embodiment of the Present Innovation

Figure 24:
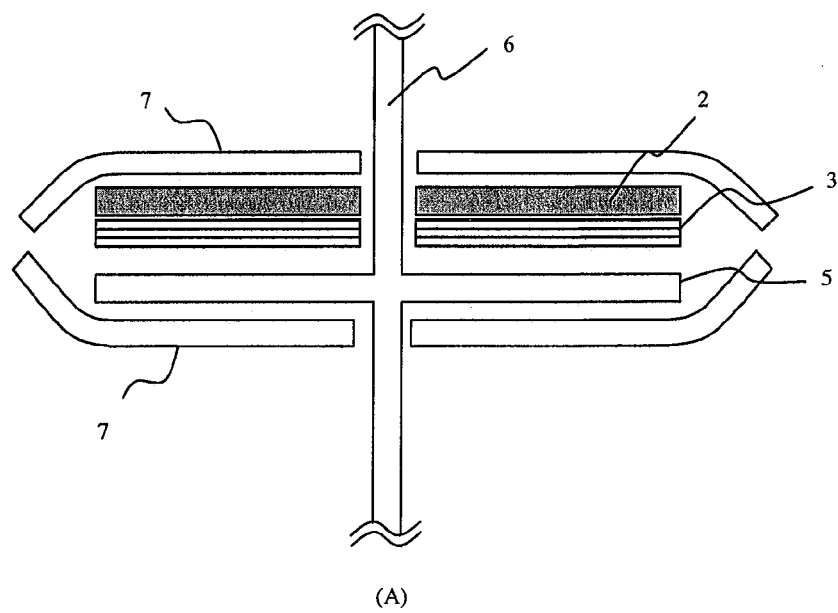
FIG. 24 includes a set of cross-sectional views of the angle detection apparatus according to the ninth embodiment of the present innovation.
Figure 24:
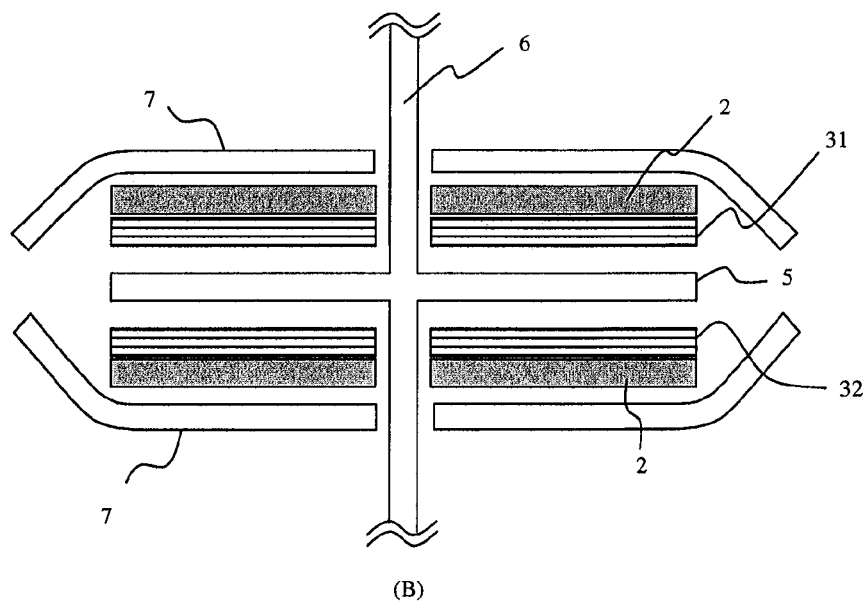

The angle detection apparatus according to this embodiment of the present innovation will be described with reference to FIG. 24. FIG. 24 includes a set of cross-sectional views of the angle detection apparatus according to the ninth embodiment of the present innovation.

The description, which overlaps with that according to the respective embodiments as described above, will be omitted in the description of the embodiment according to this embodiment of the present innovation.

The angle detection apparatus according to this embodiment of the present innovation is provided with a shield unit 7, which shields the apparatus from an external magnetic field at least in a radial direction that may be caused in the angle detection apparatus according to the respective embodiments of the present innovation. FIG. 24(A) is a cross-sectional view of the angle detection apparatus according to the first to sixth embodiments of the present innovation and FIG. 24(B) is a cross-sectional view of the angle detection apparatus according to the seventh embodiment of the present innovation. It is preferable to form the shield unit 7 by bending it outer edge so as to cover entirely the rotor 5, the stator 3 and the back yoke 2, thus not only shielding the apparatus from the outer magnetic field at least in the radial direction, but also shielding it from the outer magnetic field in a perpendicular direction to the radial direction (in the direction of the rotation shaft).

The angle detection apparatus according to this embodiment of the present innovation permits to shield the apparatus from the external magnetic field, thus detecting an angle with a high degree of accuracy.

Tenth Embodiment of the Present Innovation

Figure 25:
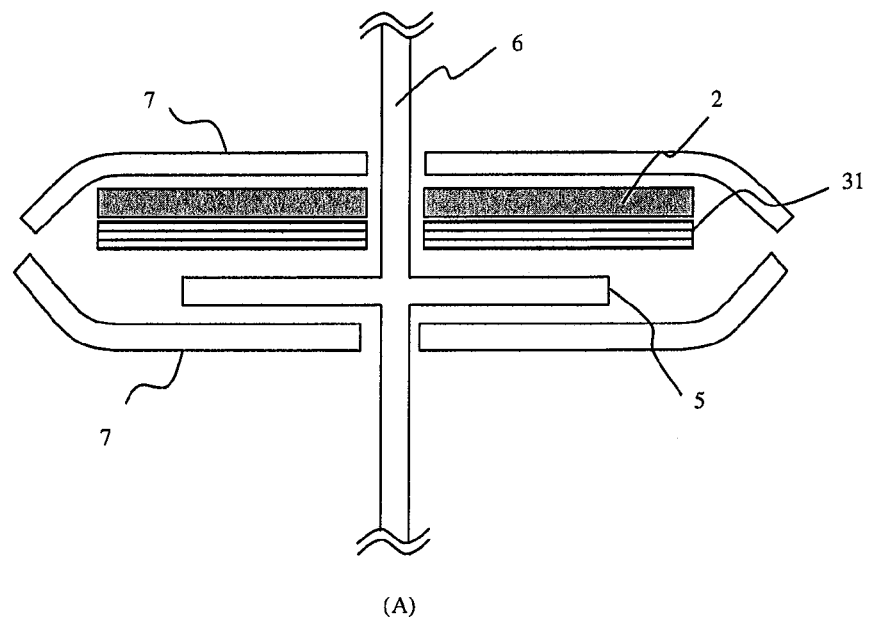
FIG. 25 includes a set of cross-sectional views of the angle detection apparatus according to the tenth embodiment of the present innovation.
Figure 25:
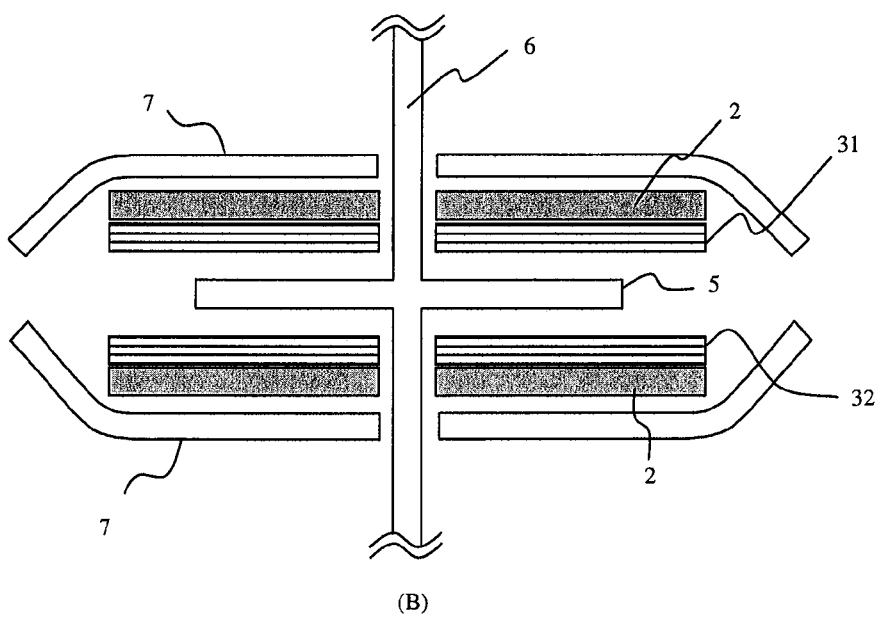

The angle detection apparatus according to this embodiment of the present innovation will be described with reference to FIG. 25. FIG. 25 includes a set of cross-sectional views of the angle detection apparatus according to the tenth embodiment of the present innovation.

The description, which overlaps with that according to the respective embodiments as described above, will be omitted in the description of the embodiment according to this embodiment of the present innovation.

In the angle detection apparatus according to this embodiment of the present innovation, the diameter of the rotor 5 is smaller than the diameter of the stator 3 and the back yoke 2, unlike the angle detection apparatus according to the embodiments as described above of the present innovation. FIG. 25(A) is a cross-sectional view of the angle detection apparatus according to the first to sixth embodiments of the present innovation and FIG. 25(B) is a cross-sectional view of the angle detection apparatus according to the seventh embodiment of the present innovation. Such a structure permits to decrease a centrifugal force of rotation applied to the rotor 5, thus reducing a load. More specifically, even if the rotor 5 rotates at a high speed, damage may be prevented. In addition to the prevention of damage of the rotor, it is possible to limit an influence of the external magnetic field in the radial direction, thus detecting the angle with a high degree of accuracy.

Incidentally, the shield unit 7 may be deleted from the structure as shown in FIG. 25.

DESCRIPTION OF REFERENCE NUMERALS

1 angle detection apparatus
2 back yoke
3 stator
4 coil
4*a* detection coil
4*b* exciting coil
40 alternating-current source
41 synchronized detection circuit
5 rotor
5*a* central point
6 rotation shaft
7 shield unit While various embodiments of the innovation have been particularly shown and described, it will be understood by those skilled in the art that various changes in form and details may be made therein without departing from the spirit and scope of the innovation as defined by the appended claims.

What is claimed is:

1. An angle detection apparatus comprises:
   a rotor in which a disk member comprising a magnetic body has a magnetic permeability, which is uniaxially anisotropic along a plane of the disk member, said disk member being rotatable around a central point in a plane of the disk member; and
   a stator comprising a plurality of coils, at least one of said coils being an exciting coil that generates a magnetic field, and at least one of said coils being a detection coil that intersects with the magnetic field excited by said exciting coil to detect a voltage corresponding to an angle of rotation of said rotor;
   wherein said stator is disposed in a vicinity of the disk member of said rotor so as to face the plane thereof.

2. The angle detection apparatus as claimed in claim 1, wherein:
   said stator has substantially a same outer shape as the disk member of said rotor, said stator being divided into a plurality of fan-shaped sections and said exciting coil and said detection coil being provided alternately on at least linear portions of the fan-shaped sections, respectively, on an outer periphery of said fan-shaped sections.

3. The angle detection apparatus as claimed in claim 2, further comprising:

a back yoke that is provided on an opposite side to said rotor relative to said stator, said back yoke having substantially a same outer shape as a disk member of said stator and being placed so as to face the disk member thereof.

4. The angle detection apparatus as claimed in claim 3, wherein:
said stator is divided into four fan-shaped sections having substantially a same outer shape;
coils, which are provided on at least linear portions of the fan-shaped sections, respectively, on an outer periphery of a set of fan-shaped sections of two sets of fan-shaped sections each of which face each other relative to a central point of a disk member of said stator, are used as the detection coil, and coils, which are provided on at least linear portions of the fan-shaped sections, respectively, on an outer periphery of other set of fan-shaped sections of said two sets of fan-shaped sections, are used as the exciting coil; and
in the set of the fan-shaped sections on which said exciting coils are provided, the exciting coils are placed so as to generate a magnetic field in which the exciting coils provided on the respective fan-shaped sections are opposite to each other in polarity, and in the other set of the fan-shaped sections on which said detection coils are provided, the detection coils are placed so that the detection coils provided on the respective fan-shaped sections are opposite to each other in polarity.

5. The angle detection apparatus as claimed in claim 2, wherein:
said stator is divided into four fan-shaped sections having substantially a same outer shape;
coils, which are provided on at least linear portions of the fan-shaped sections, respectively, on an outer periphery of a set of fan-shaped sections of two sets of fan-shaped sections each of which face each other relative to a central point of a disk member of said stator, are used as the detection coil, and coils, which are provided on at least linear portions of the fan-shaped sections, respectively, on an outer periphery of other set of fan-shaped sections of said two sets of fan-shaped sections, are used as the exciting coil; and
in the set of the fan-shaped sections on which said exciting coils are provided, the exciting coils are placed so as to generate a magnetic field in which the exciting coils provided on the respective fan-shaped sections are opposite to each other in polarity, and in the other set of the fan-shaped sections on which said detection coils are provided, the detection coils are placed so that the detection coils provided on the respective fan-shaped sections are opposite to each other in polarity.

6. The angle detection apparatus as claimed in claim 5, wherein:
there are provided as said stator two stators between which said rotor is placed, said stators facing said rotor;
said stator is stationary with a shifted phase of 45 degrees in a plane.

7. The angle detection apparatus as claimed in claim 5, wherein:
there are provided as said stator two stators with a aligned phase, and said rotor is placed between the two stators with a shifted uniaxial anisotropy of 45 degrees in a plane and bonded to the stators.

8. The angle detection apparatus as claimed in claim 5, wherein:
there are provided as said stator two stators with a shifted phase of 45 degrees in a plane, and said rotor is placed between the two stators so that the stators face the plane of said rotor and bonded to the stators.

9. The angle detection apparatus as claimed in claim 2, wherein:
said stator is divided into sixteen fan-shaped sections having substantially a same outer shape, of a set of eight fan-shaped sections as placed closely to each other, a set of four fan-shaped sections, which face each other in a cruciform relationship relative to a central point of a disk member of said stator, detects a sine component, and other set of four fan-shaped sections detects a cosine component.

10. The angle detection apparatus as claimed in claim 9, further comprising:
a back yoke that is provided on an opposite side to said rotor relative to said stator, said back yoke having substantially a same outer shape as the disk member of said stator and being placed so as to face the disk member thereof,
said back yoke being divided into eight fan-shaped sections having substantially a same outer shape in a corresponding manner to the set of eight fan-shaped sections of said stator, and a gap is provided between adjacent two of the fan-shaped sections.

11. The angle detection apparatus as claimed in claim 2, wherein:
said stator comprises fan-shaped sections as divided which is obtained by dividing the stator into a plurality of fan-shaped sections;
four fan-shaped sections as divided each having a central angle of 45degrees of said fan-shaped sections as divided being provided, as a fan-shaped section as divided for excitation, so as to face each other in a cruciform relationship relative to a central point of said disk member, the exciting coils being provided on the at least linear portion so that a direction of a magnetic field, which passes through an inside of two fan-shaped sections as divided for excitation of said four fan-shaped sections as divided for excitation is positive and a direction of a magnetic field, which passes through an inside of other two fan-shaped sections as divided for excitation thereof is negative;
four fan-shaped sections as divided being provided, as a sine detection fan-shaped section, so as to be adjacent to said fan-shaped section as divided for excitation and so as to face each other in a cruciform relationship relative to the central point of said disk member, a sine detection coil, which detects a sine component, being provided on at least the linear portion, which is adjacent to said fan-shaped section as divided for excitation, on an outer periphery of the sine detection fan-shaped section as provided, and two of said sine detection coils being aligned in a positive direction and other two of said sine detection coils being aligned in a negative direction; and
four fan-shaped sections as divided being provided, as a cosine detection fan-shaped section, so as to be adjacent to said fan-shaped section as divided for excitation on an opposite side to said sine detection fan-shaped section via said fan-shaped section as divided for excitation, and so as to face each other in a cruciform relationship relative to the central point of said disk member, a cosine detection coil, which detects a cosine component, being provided on at least the linear portion, which is adjacent to said fan-shaped section as divided for excitation, on an outer periphery of the cosine detection fan-shaped section as provided, and two of said cosine detection coils being aligned in a positive direction and other two of said cosine detection coils being aligned in a negative direction.

12. The angle detection apparatus as claimed in claim 11, further comprising:
a back yoke that is provided on an opposite side to said rotor relative to said stator,
said back yoke being provided so as to cover at least a close area between said fan-shaped sections as divided for excitation and said sine detection coil, which are placed closely to each other, and a close area between said fan-shaped sections as divided for excitation and said cosine detection coil.

13. The angle detection apparatus as claimed in claim 1, wherein:
said stator is divided into eight fan-shaped sections as divided having substantially a same outer shape, of the eight fan-shaped sections as divided, at least three fan-shaped sections are placed closely to each other so as to face the plane of said rotor in a combined state of the fan-shaped sections, and two of said detection coils and one of said exciting coil are provided alternately on at least linear portion of the fan-shaped sections, respectively, on an outer periphery of said three fan-shaped sections as divided.

14. The angle detection apparatus as claimed in claim 13, further comprising:
a back yoke that is provided on an opposite side to said rotor relative to said stator, said back yoke having substantially a same outer shape as the disk member of said stator and being placed so as to face the disk member thereof,
said back yoke being provided so as to cover at least a place in which the fan-shaped sections as divided are placed closely to each other.

15. The angle detection apparatus as claimed in claim 1, wherein:
two fan-shaped sections having a central angle of 45 degrees, of a plurality of fan-shaped sections as divided, which is obtained by dividing a disk member having substantially a same outer shape as the disk member of said rotor, are placed, as a fan-shaped section as divided for excitation, so as to face each other relative to a central point of said disk member, exciting coils are provided on at least linear portion thereof, respectively, on an outer periphery of said fan-shaped section as divided for excitation so as to generate magnetic fields, which are opposite to each other in polarity;
two of the fan-shaped sections as divided being provided, as a sine detection fan-shaped section, adjacently to said fan-shaped section as divided for excitation, so as to face each other relative to a central point of said disk member, the detection coil that detects a sine component being provided on at least linear portion on an outer periphery of the sine detection fan-shaped section, so as to be opposite to each other in polarity; and
two of the fan-shaped sections as divided being provided, as a cosine detection fan-shaped section, adjacently to said fan-shaped section as divided for excitation, on an opposite side of said sine detection fan-shaped section via the fan-shaped section as divided for excitation so as to face each other relative to a central point of said disk member, the detection coil that detects a cosine component being provided on at least linear portion on an outer periphery of the cosine detection fan-shaped section, so as to be opposite to each other in polarity.

16. The angle detection apparatus as claimed in claim 15, further comprising:
a back yoke that is provided on an opposite side to said rotor relative to said stator,
said back yoke being provided so as to cover at least a close area between said fan-shaped sections as divided for excitation and said sine detection coil, which are placed closely to each other, and a close area between said fan-shaped sections as divided for excitation and said cosine detection coil.

17. The angle detection apparatus as claimed in claim 16, wherein:
said back yoke has substantially a semicylindrical shape, one of edges thereof being placed adjacently to said fan-shaped sections as divided for excitation and other of the edges thereof being placed adjacently to said sine detection coil or said cosine detection coil.

* * * * *